(12) United States Patent
Shin et al.

(10) Patent No.: US 11,354,683 B1
(45) Date of Patent: Jun. 7, 2022

(54) METHOD AND SYSTEM FOR CREATING ANONYMOUS SHOPPER PANEL USING MULTI-MODAL SENSOR FUSION

(71) Applicants: Joonhwa Shin, State College, PA (US); Rajeev Sharma, State College, PA (US); Youngrock R Yoon, Knoxville, TN (US); Donghun Kim, State College, PA (US)

(72) Inventors: Joonhwa Shin, State College, PA (US); Rajeev Sharma, State College, PA (US); Youngrock R Yoon, Knoxville, TN (US); Donghun Kim, State College, PA (US)

(73) Assignee: VideoMining Corporation, State College, PA (US)

( * ) Notice: Subject to any disclaimer, the term of this patent is extended or adjusted under 35 U.S.C. 154(b) by 1238 days.

(21) Appl. No.: 14/984,180

(22) Filed: Dec. 30, 2015

(51) Int. Cl.
*G06Q 30/02* (2012.01)
*H04W 4/02* (2018.01)
(Continued)

(52) U.S. Cl.
CPC ......... *G06Q 30/0201* (2013.01); *H04L 67/12* (2013.01); *H04L 67/18* (2013.01);
(Continued)

(58) Field of Classification Search
CPC ......... H04L 67/12; H04L 67/18; H04L 67/22; H04L 67/306; G06Q 30/0201;
(Continued)

(56) References Cited

U.S. PATENT DOCUMENTS

| 4,331,973 A | 5/1982 | Eskin et al. |
| 4,973,952 A | 11/1990 | Malec et al. |

(Continued)

FOREIGN PATENT DOCUMENTS

FR 2906626 A1 * 4/2008 ............... G07C 9/27

OTHER PUBLICATIONS

M. Popa et al., "Analysis of shopping behavior based on surveillance system," 2010 IEEE International Conference on Systems, Man and Cybernetics, Istanbul, 2010, pp. 2512-2519, doi: 10.1109/ICSMC.2010.5641928. (Year: 2010).*

(Continued)

*Primary Examiner* — Shelby A Turner

(57) ABSTRACT

A method and system for creating an anonymous shopper panel based on multi-modal sensor data fusion. The anonymous shopper panel can serve as the same traditional shopper panel who reports their household information, such as household size, income level, demographics, etc., and their purchase history, yet without any voluntary participation. A configuration of vision sensors and mobile access points can be used to detect and track shoppers as they travel a retail environment. Fusion of those modalities can be used to form a trajectory. The trajectory data can then be associated with Point of Sale data to form a full set of shopper behavior data. Shopper behavior data for a particular visit can then be compared to data from previous shoppers' visits to determine if the shopper is a revisiting shopper. The shopper's data can then be aggregated for multiple visits to the retail location. The aggregated shopper data can be filtered using application-specific criteria to create an anonymous shopper panel.

20 Claims, 29 Drawing Sheets

(51) Int. Cl.
*H04L 67/306* (2022.01)
*H04L 67/50* (2022.01)
*H04L 67/52* (2022.01)
*H04L 67/12* (2022.01)

(52) U.S. Cl.
CPC ............ *H04L 67/22* (2013.01); *H04L 67/306* (2013.01); *H04W 4/02* (2013.01)

(58) Field of Classification Search
CPC ........... G06Q 30/0202; G06Q 30/0203; G06Q 30/0204; G06Q 30/0269; G06Q 30/0271
See application file for complete search history.

(56) References Cited

U.S. PATENT DOCUMENTS

| | | |
|---|---|---|
| 5,138,638 A | 8/1992 | Frey |
| 5,305,390 A | 4/1994 | Frey et al. |
| 5,390,107 A | 2/1995 | Nelson et al. |
| 5,401,946 A | 3/1995 | Weinblatt |
| 5,465,115 A | 11/1995 | Conrad et al. |
| 5,490,060 A | 2/1996 | Malec et al. |
| 5,557,513 A | 9/1996 | Frey et al. |
| 5,953,055 A | 9/1999 | Huang et al. |
| 5,973,732 A | 10/1999 | Guthrie |
| 6,061,088 A | 5/2000 | Khosravi et al. |
| 6,141,433 A | 10/2000 | Moed et al. |
| 6,142,876 A | 11/2000 | Cumbers |
| 6,185,314 B1 | 2/2001 | Crabtree et al. |
| 6,195,121 B1 | 2/2001 | Huang et al. |
| 6,263,088 B1 | 7/2001 | Crabtree et al. |
| 6,295,367 B1 | 9/2001 | Crabtree et al. |
| 6,560,578 B2 | 5/2003 | Eldering |
| 6,826,554 B2 | 11/2004 | Sone |
| 6,904,408 B1 | 6/2005 | Mccarthy et al. |
| 6,941,573 B1 | 9/2005 | Cowan et al. |
| 7,171,024 B2 | 1/2007 | Crabtree |
| 7,225,414 B1 | 5/2007 | Sharma et al. |
| 7,227,976 B1 | 6/2007 | Jung et al. |
| 7,240,027 B2 | 7/2007 | McConnell et al. |
| 7,274,803 B1 | 9/2007 | Sharma et al. |
| 7,283,650 B1 | 10/2007 | Sharma et al. |
| 7,317,812 B1 | 1/2008 | Krahnstoever et al. |
| 7,319,479 B1 * | 1/2008 | Crabtree ................... G01S 5/16 348/169 |
| 7,319,779 B1 | 1/2008 | Mummareddy et al. |
| 7,357,717 B1 | 4/2008 | Cumbers |
| 7,360,251 B2 | 4/2008 | Spalink et al. |
| 7,400,745 B2 | 7/2008 | Crabtree |
| 7,415,510 B1 | 8/2008 | Kramerich et al. |
| 7,505,621 B1 | 3/2009 | Agrawal et al. |
| 7,530,489 B2 | 5/2009 | Stockton |
| 7,551,755 B1 | 6/2009 | Steinberg et al. |
| 7,587,068 B1 | 9/2009 | Steinberg et al. |
| 7,590,261 B1 | 9/2009 | Mariano et al. |
| 7,606,728 B2 | 10/2009 | Sorensen |
| 7,658,327 B2 | 2/2010 | Tuchman et al. |
| 7,702,132 B2 | 4/2010 | Crabtree |
| 7,711,155 B1 | 5/2010 | Sharma et al. |
| 7,742,623 B1 | 6/2010 | Moon et al. |
| 7,805,333 B2 | 9/2010 | Kepecs |
| 7,848,548 B1 | 12/2010 | Moon et al. |
| 7,873,529 B2 | 1/2011 | Kruger et al. |
| 7,903,141 B1 | 3/2011 | Mariano et al. |
| 7,904,477 B2 | 3/2011 | Jung et al. |
| 7,911,482 B1 | 3/2011 | Mariano et al. |
| 7,912,246 B1 | 3/2011 | Moon et al. |
| 7,921,036 B1 * | 4/2011 | Sharma ................... G06Q 30/02 705/14.66 |
| 7,925,549 B2 | 4/2011 | Looney et al. |
| 7,927,213 B2 | 4/2011 | Norton et al. |
| 7,930,204 B1 | 4/2011 | Sharma et al. |
| 7,949,639 B2 | 5/2011 | Hunt et al. |
| 7,957,565 B1 | 6/2011 | Sharma et al. |
| 7,965,866 B2 | 6/2011 | Wang et al. |
| 7,974,869 B1 | 7/2011 | Sharma et al. |
| 7,974,889 B2 | 7/2011 | Raimbeault |
| 7,987,105 B2 | 7/2011 | Mcneill et al. |
| 7,987,111 B1 * | 7/2011 | Sharma ................... G06Q 30/02 705/7.29 |
| 8,009,863 B1 | 8/2011 | Sharma et al. |
| 8,010,402 B1 * | 8/2011 | Sharma ................... G06Q 10/00 705/14.49 |
| 8,027,521 B1 | 9/2011 | Moon et al. |
| 8,027,864 B2 | 9/2011 | Gilbert |
| 8,095,589 B2 | 1/2012 | Singh et al. |
| 8,098,888 B1 * | 1/2012 | Mummareddy ... G06K 9/00778 382/103 |
| 8,160,984 B2 | 4/2012 | Hunt et al. |
| 8,175,908 B1 | 5/2012 | Anderson |
| 8,189,926 B2 | 5/2012 | Sharma et al. |
| 8,207,851 B2 | 6/2012 | Christopher |
| 8,210,939 B2 | 7/2012 | Norton et al. |
| 8,214,246 B2 | 7/2012 | Springfield et al. |
| 8,219,438 B1 | 7/2012 | Moon et al. |
| 8,238,607 B2 | 8/2012 | Wang et al. |
| 8,254,633 B1 | 8/2012 | Moon et al. |
| 8,295,597 B1 | 10/2012 | Sharma et al. |
| 8,325,228 B2 | 12/2012 | Mariadoss |
| 8,325,982 B1 | 12/2012 | Moon et al. |
| 8,340,685 B2 | 12/2012 | Cochran et al. |
| 8,351,647 B2 | 1/2013 | Sharma et al. |
| 8,379,937 B1 | 2/2013 | Moon et al. |
| 8,380,558 B1 * | 2/2013 | Sharma ................... G06Q 30/02 705/7.29 |
| 8,401,248 B1 | 3/2013 | Moon et al. |
| 8,412,656 B1 * | 4/2013 | Baboo ................ G06Q 30/0282 706/20 |
| 8,433,612 B1 | 4/2013 | Sharma et al. |
| 8,441,351 B2 | 5/2013 | Christopher |
| 8,452,639 B2 | 5/2013 | Abe et al. |
| 8,457,466 B1 | 6/2013 | Sharma et al. |
| 8,462,996 B2 | 6/2013 | Moon et al. |
| 8,472,672 B2 | 6/2013 | Wang et al. |
| 8,489,532 B2 | 7/2013 | Hunt et al. |
| 8,504,598 B2 | 8/2013 | West |
| 8,520,906 B1 | 8/2013 | Moon et al. |
| 8,521,590 B1 | 8/2013 | Hanusch |
| 8,570,376 B1 | 10/2013 | Sharma et al. |
| 8,577,705 B1 | 11/2013 | Baboo et al. |
| 8,589,208 B2 | 11/2013 | Kruger et al. |
| 8,597,111 B2 | 12/2013 | LeMay et al. |
| 8,620,718 B2 | 12/2013 | Varghese et al. |
| 8,660,895 B1 | 2/2014 | Saurabh et al. |
| 8,665,333 B1 | 3/2014 | Sharma et al. |
| 8,694,792 B2 | 4/2014 | Whillock |
| 8,699,370 B2 | 4/2014 | Leung et al. |
| 8,706,544 B1 | 4/2014 | Sharma et al. |
| 8,714,457 B2 | 5/2014 | August et al. |
| 8,719,266 B2 | 5/2014 | West |
| 8,739,254 B2 | 5/2014 | Aaron |
| 8,781,502 B1 | 7/2014 | Middleton et al. |
| 8,781,877 B2 | 7/2014 | Kruger et al. |
| 8,799,098 B2 | 8/2014 | Favish |
| 8,812,344 B1 | 8/2014 | Saurabh et al. |
| 8,830,030 B2 | 9/2014 | Arthurs et al. |
| 8,873,813 B2 | 10/2014 | Tadayon et al. |
| 8,909,542 B2 | 12/2014 | Montero et al. |
| 8,913,791 B2 | 12/2014 | Datta et al. |
| 8,930,134 B2 | 1/2015 | Gu et al. |
| 8,941,735 B2 | 1/2015 | Mariadoss |
| 8,955,001 B2 | 2/2015 | Bhatia et al. |
| 8,978,086 B2 | 3/2015 | Bhatia et al. |
| 8,989,775 B2 | 3/2015 | Shaw |
| 9,003,488 B2 | 4/2015 | Spencer et al. |
| 9,035,771 B2 | 5/2015 | Argue et al. |
| 9,036,028 B2 | 5/2015 | Buehler |
| 9,092,797 B2 | 7/2015 | Perez et al. |
| 9,094,322 B2 | 7/2015 | Brown |
| 9,111,157 B2 | 8/2015 | Christopher |
| 9,124,778 B1 | 9/2015 | Crabtree |
| 9,140,773 B2 | 9/2015 | Oliver |
| 9,165,375 B2 | 10/2015 | Datta et al. |
| 9,177,195 B2 | 11/2015 | Marcheselli et al. |

(56) References Cited

U.S. PATENT DOCUMENTS

| | | | |
|---|---|---|---|
| 9,448,072 B2* | 9/2016 | Bandyopadhyay | G01C 21/3626 |
| 2001/0027564 A1 | 10/2001 | Cowan et al. | |
| 2002/0016740 A1* | 2/2002 | Ogasawara | G06Q 30/02 705/26.1 |
| 2003/0033190 A1 | 2/2003 | Shan et al. | |
| 2003/0212596 A1 | 11/2003 | DiPaolo et al. | |
| 2004/0002897 A1 | 1/2004 | Vishik | |
| 2004/0111454 A1 | 6/2004 | Sorensen | |
| 2004/0176995 A1 | 9/2004 | Fusz | |
| 2004/0249848 A1 | 12/2004 | Carlbom et al. | |
| 2005/0021397 A1 | 1/2005 | Cui et al. | |
| 2005/0096997 A1 | 5/2005 | Jain et al. | |
| 2005/0117778 A1 | 6/2005 | Crabtree | |
| 2005/0187972 A1 | 8/2005 | Kruger et al. | |
| 2005/0246196 A1 | 11/2005 | Frantz et al. | |
| 2005/0288954 A1 | 12/2005 | Mccarthy et al. | |
| 2006/0010028 A1 | 1/2006 | Sorensen | |
| 2006/0069585 A1 | 3/2006 | Springfield et al. | |
| 2006/0074769 A1 | 4/2006 | Looney et al. | |
| 2006/0080265 A1 | 4/2006 | Hinds et al. | |
| 2006/0085255 A1 | 4/2006 | Hastings et al. | |
| 2006/0089837 A1 | 4/2006 | Adar et al. | |
| 2006/0229996 A1 | 10/2006 | Keithley et al. | |
| 2006/0293921 A1 | 12/2006 | Mccarthy et al. | |
| 2007/0015569 A1 | 1/2007 | Norton et al. | |
| 2007/0122002 A1 | 5/2007 | Crabtree | |
| 2007/0138268 A1 | 6/2007 | Tuchman | |
| 2007/0156515 A1 | 7/2007 | Hasselback et al. | |
| 2007/0182818 A1 | 8/2007 | Buehler | |
| 2007/0239871 A1 | 10/2007 | Kaskie | |
| 2007/0282681 A1 | 12/2007 | Shubert et al. | |
| 2008/0004892 A1 | 1/2008 | Zucker | |
| 2008/0042836 A1 | 2/2008 | Christopher | |
| 2008/0109397 A1* | 5/2008 | Sharma | G06Q 30/02 |
| 2008/0159634 A1* | 7/2008 | Sharma | G06K 9/00771 382/224 |
| 2008/0172282 A1 | 7/2008 | Mcneill et al. | |
| 2008/0201198 A1 | 8/2008 | Louviere et al. | |
| 2008/0263000 A1 | 10/2008 | West et al. | |
| 2008/0263065 A1 | 10/2008 | West | |
| 2008/0270363 A1 | 10/2008 | Hunt et al. | |
| 2008/0288209 A1 | 11/2008 | Hunt et al. | |
| 2008/0288522 A1 | 11/2008 | Hunt et al. | |
| 2008/0288538 A1 | 11/2008 | Hunt et al. | |
| 2008/0288889 A1 | 11/2008 | Hunt et al. | |
| 2008/0294372 A1 | 11/2008 | Hunt et al. | |
| 2008/0294583 A1 | 11/2008 | Hunt et al. | |
| 2008/0294996 A1 | 11/2008 | Hunt et al. | |
| 2008/0318591 A1 | 12/2008 | Oliver | |
| 2008/0319829 A1 | 12/2008 | Hunt et al. | |
| 2009/0006309 A1 | 1/2009 | Hunt et al. | |
| 2009/0006490 A1 | 1/2009 | Hunt et al. | |
| 2009/0006788 A1 | 1/2009 | Hunt et al. | |
| 2009/0010490 A1 | 1/2009 | Wang et al. | |
| 2009/0012971 A1 | 1/2009 | Hunt et al. | |
| 2009/0018996 A1 | 1/2009 | Hunt et al. | |
| 2009/0037412 A1 | 2/2009 | Bard et al. | |
| 2009/0046201 A1 | 2/2009 | Kastilahn et al. | |
| 2009/0097706 A1 | 4/2009 | Crabtree | |
| 2009/0158309 A1 | 6/2009 | Moon et al. | |
| 2009/0198507 A1 | 8/2009 | Rhodus | |
| 2010/0020172 A1 | 1/2010 | Mariadoss | |
| 2010/0124357 A1* | 5/2010 | Hampapur | G06K 9/00778 382/103 |
| 2011/0022312 A1 | 1/2011 | McDonough et al. | |
| 2011/0093324 A1 | 4/2011 | Fordyce, III et al. | |
| 2011/0125551 A1 | 5/2011 | Peiser | |
| 2011/0137924 A1 | 6/2011 | Hunt et al. | |
| 2011/0151967 A1 | 6/2011 | Norton et al. | |
| 2011/0169917 A1 | 7/2011 | Stephen et al. | |
| 2011/0238471 A1 | 9/2011 | Trzcinski | |
| 2011/0246284 A1 | 10/2011 | Chaikin et al. | |
| 2011/0252015 A1 | 10/2011 | Bard et al. | |
| 2011/0286633 A1 | 11/2011 | Wang et al. | |
| 2012/0041767 A1 | 2/2012 | Hoffman et al. | |
| 2012/0046044 A1* | 2/2012 | Jamtgaard | H04W 4/029 455/456.1 |
| 2012/0078675 A1 | 3/2012 | Mcneill et al. | |
| 2012/0150587 A1 | 6/2012 | Kruger et al. | |
| 2012/0158460 A1 | 6/2012 | Kruger et al. | |
| 2012/0163206 A1 | 6/2012 | Leung et al. | |
| 2012/0173472 A1 | 7/2012 | Hunt et al. | |
| 2012/0239504 A1 | 9/2012 | Curlander | |
| 2012/0249325 A1 | 10/2012 | Christopher | |
| 2012/0254718 A1 | 10/2012 | Nayar et al. | |
| 2012/0314905 A1 | 12/2012 | Wang et al. | |
| 2012/0316936 A1 | 12/2012 | Jacobs | |
| 2012/0323682 A1 | 12/2012 | Shanbhag et al. | |
| 2012/0331561 A1 | 12/2012 | Broadstone et al. | |
| 2013/0014138 A1 | 1/2013 | Bhatia et al. | |
| 2013/0014145 A1 | 1/2013 | Bhatia et al. | |
| 2013/0014146 A1 | 1/2013 | Bhatia et al. | |
| 2013/0014153 A1 | 1/2013 | Bhatia et al. | |
| 2013/0014158 A1 | 1/2013 | Bhatia et al. | |
| 2013/0019258 A1 | 1/2013 | Bhatia et al. | |
| 2013/0019262 A1 | 1/2013 | Bhatia et al. | |
| 2013/0035985 A1 | 2/2013 | Gilbert | |
| 2013/0041837 A1 | 2/2013 | Dempski et al. | |
| 2013/0063556 A1 | 3/2013 | Russell et al. | |
| 2013/0091001 A1 | 4/2013 | Jia et al. | |
| 2013/0110676 A1 | 5/2013 | Kobres | |
| 2013/0014485 A1 | 6/2013 | Reynolds | |
| 2013/0151311 A1 | 6/2013 | Smallwood et al. | |
| 2013/0182114 A1* | 7/2013 | Zhang | A61B 5/0046 348/150 |
| 2013/0182904 A1 | 7/2013 | Zhang et al. | |
| 2013/0184887 A1 | 7/2013 | Ainsley et al. | |
| 2013/0185645 A1 | 7/2013 | Fisk et al. | |
| 2013/0197987 A1 | 8/2013 | Doka et al. | |
| 2013/0218677 A1 | 8/2013 | Yopp et al. | |
| 2013/0222599 A1 | 8/2013 | Shaw | |
| 2013/0225199 A1 | 8/2013 | Shaw | |
| 2013/0226539 A1 | 8/2013 | Shaw | |
| 2013/0226655 A1 | 8/2013 | Shaw | |
| 2013/0138498 A1 | 9/2013 | Raghavan | |
| 2013/0231180 A1 | 9/2013 | Kelly et al. | |
| 2013/0236058 A1 | 9/2013 | Wang et al. | |
| 2013/0271598 A1 | 10/2013 | Mariadoss | |
| 2013/0293355 A1 | 11/2013 | Christopher | |
| 2013/0294646 A1 | 11/2013 | Shaw | |
| 2013/0311332 A1 | 11/2013 | Favish | |
| 2013/0314505 A1 | 11/2013 | Stephen et al. | |
| 2013/0317944 A1* | 11/2013 | Huang | G06Q 30/0623 705/26.61 |
| 2013/0317950 A1 | 11/2013 | Abraham et al. | |
| 2014/0019178 A1 | 1/2014 | Kortum et al. | |
| 2014/0019300 A1 | 1/2014 | Sinclair | |
| 2014/0032269 A1 | 1/2014 | West | |
| 2014/0079282 A1 | 3/2014 | Marcheselli et al. | |
| 2014/0079297 A1 | 3/2014 | Tadayon et al. | |
| 2014/0095260 A1 | 4/2014 | Weiss et al. | |
| 2014/0164179 A1 | 6/2014 | Geisinger et al. | |
| 2014/0172557 A1 | 6/2014 | Eden et al. | |
| 2014/0173641 A1 | 6/2014 | Bhatia et al. | |
| 2014/0173643 A1 | 6/2014 | Bhatia et al. | |
| 2014/0195302 A1* | 7/2014 | Yopp | G06Q 10/047 705/7.33 |
| 2014/0195380 A1 | 7/2014 | Jamtgaard et al. | |
| 2014/0201126 A1 | 7/2014 | Zadeh et al. | |
| 2014/0210621 A1 | 7/2014 | Argue et al. | |
| 2014/0219118 A1 | 8/2014 | Middleton et al. | |
| 2014/0222503 A1 | 8/2014 | Vijayaraghavan et al. | |
| 2014/0222573 A1 | 8/2014 | Middleton et al. | |
| 2014/0222685 A1 | 8/2014 | Middleton et al. | |
| 2014/0229616 A1 | 8/2014 | Leung et al. | |
| 2014/0233852 A1 | 8/2014 | Lee | |
| 2014/0253732 A1 | 9/2014 | Brown et al. | |
| 2014/0258939 A1 | 9/2014 | Schafer et al. | |
| 2014/0278967 A1 | 9/2014 | Pal et al. | |
| 2014/0283136 A1 | 9/2014 | Dougherty et al. | |
| 2014/0031923 A1 | 10/2014 | Vemana | |
| 2014/0294231 A1 | 10/2014 | Datta et al. | |
| 2014/0351835 A1 | 11/2014 | Orlowski | |

(56) References Cited

U.S. PATENT DOCUMENTS

| | | |
|---|---|---|
| 2014/0358640 A1 | 12/2014 | Besehanic et al. |
| 2014/0358661 A1 | 12/2014 | Or et al. |
| 2014/0358742 A1 | 12/2014 | Achan et al. |
| 2014/0372176 A1 | 12/2014 | Fusz |
| 2014/0379296 A1* | 12/2014 | Nathan .................. G06V 20/52 702/150 |
| 2015/0006243 A1* | 1/2015 | Yuasa ................. G06Q 30/0201 705/7.29 |
| 2015/0006358 A1 | 1/2015 | Oshry et al. |
| 2015/0012337 A1 | 1/2015 | Kruger et al. |
| 2015/0025936 A1 | 1/2015 | Garel et al. |
| 2015/9925936 | 1/2015 | Garel et al. |
| 2015/0055830 A1 | 2/2015 | Datta et al. |
| 2015/0058049 A1 | 2/2015 | Shaw |
| 2015/0062338 A1 | 3/2015 | Mariadoss |
| 2015/0078658 A1 | 3/2015 | Lee |
| 2015/0081704 A1 | 3/2015 | Hannan et al. |
| 2015/0098661 A1* | 4/2015 | Brown ................ G06K 9/00369 382/224 |
| 2015/0106190 A1 | 4/2015 | Wang et al. |
| 2015/0154312 A1 | 6/2015 | Tilwani et al. |
| 2015/0154534 A1 | 6/2015 | Tilwani et al. |
| 2015/0181387 A1 | 6/2015 | Shaw |
| 2015/0199627 A1 | 7/2015 | Gould et al. |
| 2015/0221094 A1 | 8/2015 | Marcheselli et al. |
| 2015/0235237 A1* | 8/2015 | Shaw ................. G06Q 30/0201 705/7.29 |
| 2015/0244992 A1 | 8/2015 | Buehler |
| 2015/0287306 A1* | 10/2015 | Hallett ............... G08B 13/2482 340/572.1 |
| 2015/0294482 A1 | 10/2015 | Stephen et al. |
| 2015/0310447 A1 | 10/2015 | Shaw |
| 2015/0334469 A1 | 11/2015 | Bhatia et al. |
| 2017/0068913 A1* | 3/2017 | Pignataro ......... G06Q 10/06315 |
| 2018/0012079 A1* | 1/2018 | Blanchflower ...... G06Q 10/067 |

OTHER PUBLICATIONS

"Anonymous Customer Profiling and Offer Generation", IP.com Prior Art Database, Aug. 31, 2006. https://ip.com/IPCOM/000139934 (Year: 2006).*

C. You, C. Wei, Y. Chen, H. Chu and M. Chen, "Using Mobile Phones to Monitor Shopping Time at Physical Stores," in IEEE Pervasive Computing, vol. 10, No. 2, pp. 37-43, Apr.-Jun. 2011, doi: 10.1109/MPRV.2011.14. (Year: 2011).*

M. Popa et al., "Analysis of shopping behavior based on surveillance system," 2010 IEEE International Conference on Systems, Man and Cybernetics, 2010, pp. 2512-2519, doi: 10.1109/ICSMC.2010.5641928. (Year: 2010).*

Mandeljc R, Kovačič S, Kristan M, Perš J. Tracking by identification using computer vision and radio. Sensors (Basel). 2012; 13(1): 241-273. Published Dec. 24, 2012. doi:10.3390/s130100241: (Year: 2012).*

S. Papaioannou, H. Wen, A. Markham and N. Trigoni, "Fusion of Radio and Camera Sensor Data for Accurate Indoor Positioning," 2014 IEEE 11th International Conference on Mobile Ad Hoc and Sensor Systems, 2014, pp. 109-117, doi: 10.1109/MASS.2014.52. (Year: 2014).*

IAB, "Targeting Local Markets: An IAB Interactive Advertising Guide," http://www.iab.net/local_committee, Sep. 2010, 18 pages.

S. Clifford and Q. Hardy, "Attention, Shoppers: Store Is Tracking Your Cell," The New York Times, http://www.nytimes.com/2013/07/15/business/attention-shopper-stores-are-tracking-your-cell.html, Jul. 14, 2013, 5 pages.

"Aerohive and Euclid Retail Analytics," Partner Solution Brief, Aerohive Networks and Euclid, 2013, 9 pages.

* cited by examiner

Shopper Profile Data 300

Shopper ID Vector (SIV) 301
　　Global ID Vector
　　Local ID Vector (i.e., unique within a single visit)

Shopper Segment Data (SSD) 302
　　Physical segment data
　　Behavioral segment data

Shopper Behavior Dataset (SBD) 303
　　Shopper metrics
　　A list of *TripVector* for each visit
　　　　Physical attributes
　　　　Contextual attributes
　　　　PoS data

FIG. 3

METHOD AND SYSTEM FOR CREATING ANONYMOUS SHOPPER PANEL USING MULTI-MODAL SENSOR FUSION

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

Field of the Invention

This disclosure presents a method and system regarding the field of market research, multi-modal sensing, tracking and analytics, pattern recognition, data fusion, and specifically for the creation of an anonymous shopper panel.

Background of the Invention

Understanding shopper behavior is an area of particular interest to consumer packaged goods companies (CPGs) and retailers since shopper behavior is critical to optimize marketing strategies including store layout planning and package design. Various methods have developed to help marketers better understand in-store shopper behavior and its effect on purchasing decisions.

Traditional methods of shopper behavior analysis often rely on a recruited panel of shoppers for actual store testing or small-scale lab testing. These traditional methods have the disadvantage of low sample size or extensive manual operations. Furthermore, in the case of shopper panels or lab testing, shoppers are aware that their behavior is being analyzed, which introduces an artificial bias into the shopping behavior data. This necessitates the creation of a large-scale (large sample size, collected over time) shopper panel that can serve as the same traditional shopper panel who reports their household information (such as household size, income level, demographics, etc.) and their purchase history, yet without any voluntary participation. We refer to this type of shopper panel as the anonymous shopper panel.

There are many challenges in creating and maintaining such anonymous shopper panels: (1) since they do not explicitly report household information and any other information that can characterize themselves, all of such information must be estimated from measured and collected data using a sensing system that monitors their behavior, which inherently entails some uncertainty and errors. (2) Unlike the traditional shopper panel where members voluntarily identify themselves when reporting, the anonymous shopper panel members do not, thus the sensing system should identify and recognize each different shopper in the anonymous shopper panel.

There have been various other attempts to characterize shopper behavior: Some have used transaction history data to determine shopper behavior, based on the items purchased during a given shopping trip. Demographics information about a shopper can be determined from information provided when obtaining a loyalty card or estimated using other means. The fusion of the transaction data with the demographics information can aid a retailer in more effectively targeting messaging to customers. These methods, however, rely merely on customer purchase behavior (which reflects only the end result of a shopping trip), and do not accurately portray the dynamic behavior of a customer while shopping in the store.

Some have attempted to generate larger-scale shopper panels by fusing traditional panel data with transaction data collected over longer periods. While this results in a greater sampling of data, the use of a traditional panel does not provide anonymity. Others have combined household panel data with aggregated traffic data to generate a statistically anonymized panel. This anonymizes some of the data, but is still not a complete solution. None of these attempts have resulted in a truly anonymous (i.e., without any voluntary participation) shopper panel.

BRIEF SUMMARY OF THE INVENTION

A method for creating an anonymous shopper panel based on an association of multi-modal shopper data, wherein the multi-modal shopper data comprises a shopper ID vector, shopper segment data, and shopper behavior data, wherein the association of multi-modal shopper data forms shopper profile data, and using at least a processor and a plurality of mobile signal sensors and a plurality of vision sensors to perform the steps of detecting at least one person at the entrance of a location using an At-Door Shopper Detector module, tracking the movements of said at least one person at said location, forming at least one trajectory using a Multi-modal Shopper Tracker module, associating the at least one trajectory with shopper segment data and the at least one trajectory with Point-of-Sale (PoS) data to generate shopper profile data using a Multi-modal Shopper Data Associator module, populating an in-store shopper database with the shopper profile data, identifying a revisiting shopper using shopper profile data from the Multi-modal Shopper Data Associator module and populating a shopper database with the result, using a Revisiting Shopper Identifier module, and using the shopper database, a Shopper Behavior Profiler module, and an Anonymous Panel Creator module, creating an anonymous shopper panel for at least one application using a set of application-specific criteria.

One aspect of the invention presents a method for creating an anonymous shopper panel using multi-modal sensor fusion. The anonymous shopper panel can serve as the same traditional shopper panel who reports their household information (such as household size, income level, demographics, etc.) and their purchase history, yet without any voluntary participation. The advantages of the anonymous shopper panel over a traditional shopper panel include (1) the unobtrusiveness in all the shopping activity measurements without any intervention, (2) the longer participation in a study since the anonymous shopper panel members are unknowingly participating in the study and thus they do not opt out unless there is an explicit way, (3) the same anonymous shopper panel can be used for multiple iterative studies without any limitations, and (4) the size of the anonymous shopper panel could theoretically be all of the shoppers who go to a retail store where a proper sensing system is deployed, and therefore could be much larger than the recruited shopper panels.

One aspect of the invention addresses the challenges to creating the anonymous shopper panel as stated in the background section, and thus can enable the creation of anonymous shopper panel by multi-modal sensor fusion.

The employment of the multi-modal sensor fusion was motivated by the fact that a shopper's various states can be measured using different sensing modalities such as vision and mobile signals. One skilled in the art would recognize that we can analyze shopper's behavior using cameras and computer vision technologies. In addition, a significant portion of the shoppers carry their own mobile devices with Wi-Fi and/or Bluetooth radios, and the Wi-Fi radio in a mobile device is usually programmed to transmit short ping-like packets periodically to update its Access Point (AP) list. A sensing system can exploit this observation in order to localize and track shoppers within its sensing range.

Besides the availability of multiple sensing modalities to track a shopper, the multi-modal sensor fusion approach can be employed due to the fact that a single modality-based shopper tracking has its own limitations. Tracking a single shopper across multiple fields of view of cameras and joining that person's shopper paths do not usually yield a complete, unbroken trajectory. Because computer vision algorithms are vulnerable to cluttered backgrounds or visually similar but irrelevant nearby objects, vision-based tracking often results in discontinuous tracking of a shopper and fragmented trajectories. Because of trajectory fragmentation, store-wide analysis becomes more difficult and less accurate.

Another aspect of the invention can incorporate Wi-Fi based tracking with vision-based tracking to address the challenges of vision-based tracking for in-store shopper behavior analysis. Although Wi-Fi based tracking has less accuracy and lower resolution than vision-based tracking, it has the advantage of providing a consistent identification across tracking in the form of a unique MAC address. When vision-based tracking and Wi-Fi based tracking are combined and yield a fused trajectory as explained in following sections, the aspect can allow for consistent tracking on the store-level and can enable filtering of shoppers and/or shopper groups for more specific analysis.

Given the measurements about the shoppers, another aspect of the invention describes a system architecture that can allow the estimation of a shopper's household information by employing different types of shopper behavior profilers. The estimated shopper's household information can be used to create different anonymous shopper panels for different applications with their application-specific criteria.

BRIEF DESCRIPTION OF DRAWINGS

FIG. 3 shows the data components that can comprise the Shopper Profile Data.

DETAILED DESCRIPTION

System Overview

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
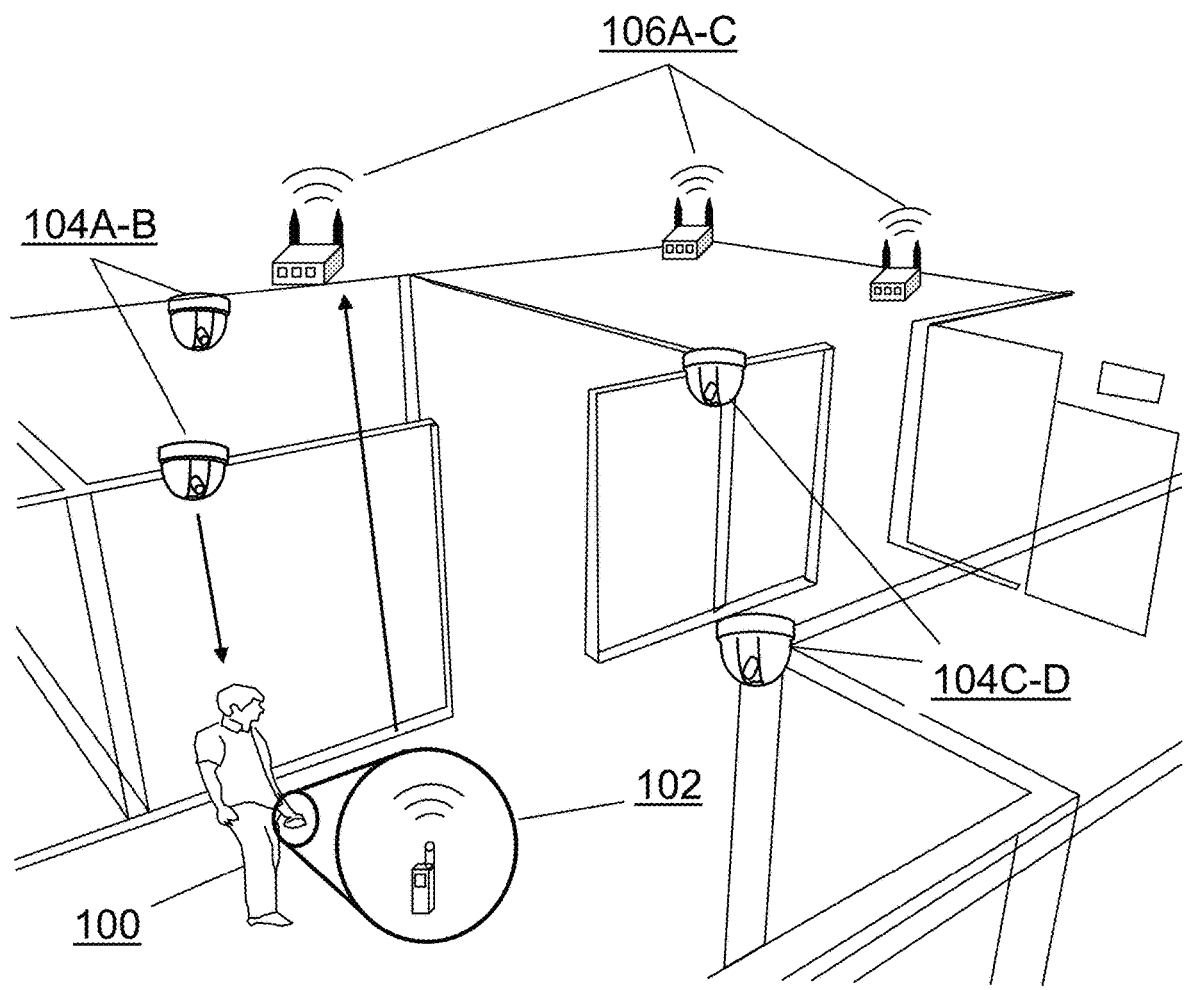
FIG. 1 shows an exemplary embodiment for tracking persons using multi-modal tracking.

FIG. 1 shows an overview of an application where an exemplary embodiment of the present invention is deployed and used in an indoor environment. The indoor environment can be covered by a set of cameras 104 A-D and APs 106 A-C in such a way that most of the location in the area can be captured/measured by at least a single camera and by at least three APs, so that both visual feature-based tracking and mobile signal trilateration-based tracking can be carried out.

Figure 2:
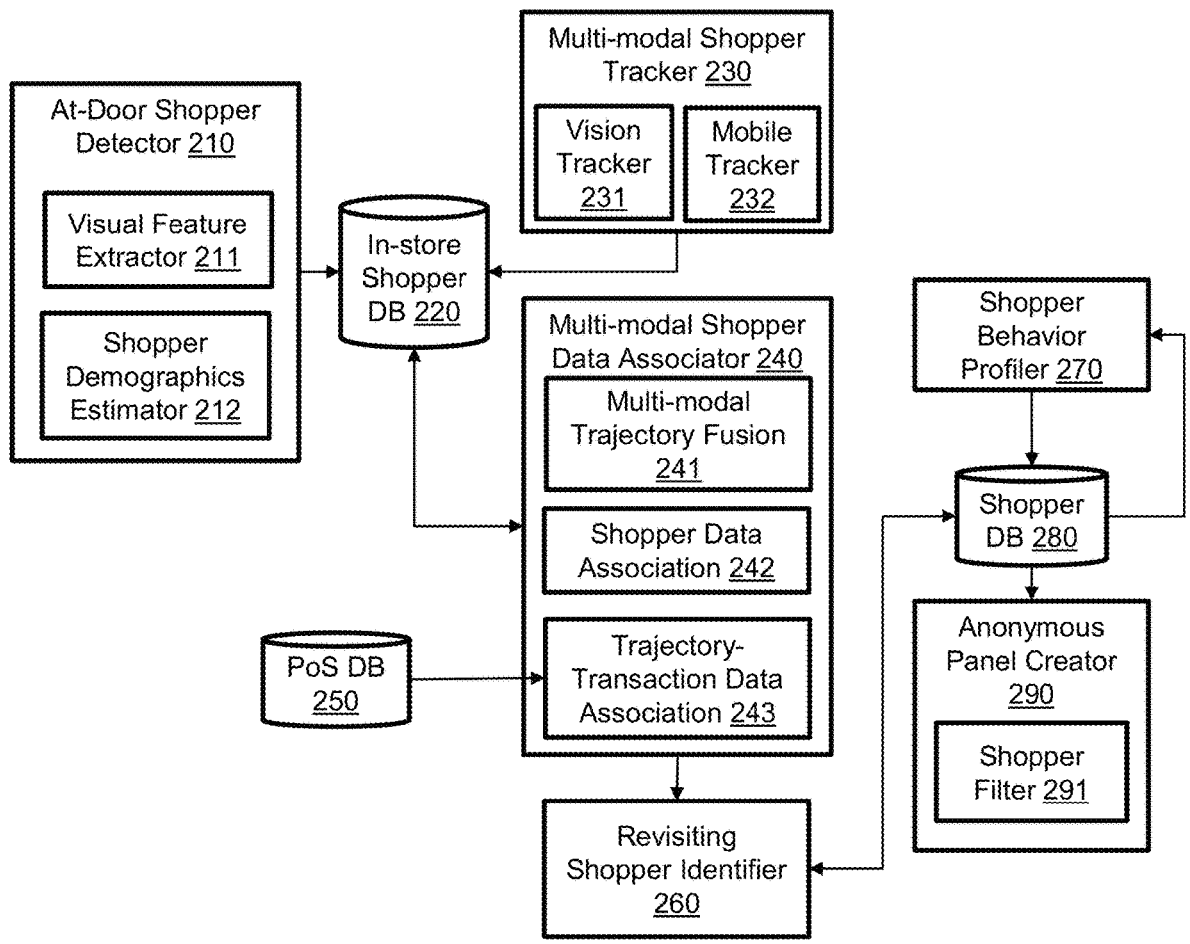
FIG. 2 shows an example block flow diagram illustrating an overview of the anonymous panel creation system.

FIG. 2 provides an overview of an exemplary embodiment of the anonymous panel creation system.

The At-Door Shopper Detector 210 (utilizing the Visual Feature Extractor 211 and Shopper Demographics Estimator 212 modules) can capture an image of a shopper upon entrance to the location. The module can detect the face of a shopper as well as other body features. The detected face features can then be used to estimate demographics information about the shopper such as gender, age, and ethnicity. This data can then be added to the shopper profile data (a set of information collected and analyzed from shoppers to enable the creation of anonymous panels and described in more detail in the following section) and stored in the In-Store Shopper DB 220.

The Multi-modal Shopper Tracker 230 (utilizing the Vision Tracker 231 and Mobile Tracker 232) can also detect and track shoppers from the time the store is entered and as the shopper travels the store. The Vision Tracker 231 and Mobile Tracker 232 can use vision and mobile data, respectively, to produce shopper trajectories that represent a shopper's entire trip through the store. The Vision Tracker 231 can provide an accurate track as a shopper moves through a location, however, a number of issues (such as background clutter and non-overlapping camera coverage) can cause discontinuities in the trajectory. The discontinuities can be rectified algorithmically (for example, by re-identifying a shopper with shopper profile data already existing in the database) and augmented using mobile data. The Mobile Tracker 232 can isolate individual mobile device tracks using the unique MAC address of each tracked device, and use methods such as translateration to localize the device. While localization accuracy can be limited using the wireless modality, the track is persistent. Data from each modality can be stored separately as shopper profile data in the In-store Shopper DB 220.

The Multi-modal Shopper Data Associator 240 can use data from the In-store Shopper DB 220 and the Point-of-Sale (PoS) DB 250 to fuse shopper trajectories collected via multiple sensing modalities (utilizing the Multi-modal Trajectory Fusion 241 module), can associate the appropriate shopper data (utilizing the Shopper Data Association 242 module), and can perform Trajectory-Transaction Data Association 243. The Multi-modal Trajectory Fusion 241 module can fuse associated trajectories from each tracking modality to generate a more accurate and continuous track for each person. Remaining discontinuities can then be interpolated, and the resulting track stored as shopper profile data in the In-Store Shopper DB 220.

The Shopper Data Association 242 module can then merge the fused trajectory with face and body feature data as well as demographics data obtained by the At-Door Shopper Detector 210 process. This associated data can form new shopper profile data that can be stored in the In-Store Shopper DB 220. The Trajectory-Transaction Data Association 243 module can then associate the new shopper profile data with transaction (also called Point of Sale or PoS) data from the PoS DB 250. So, while the trajectory can indicate where the shopper has traveled through a store, the association with transaction data can indicate what items were actually purchased during the trip.

Creation of an anonymous shopper panel can be dependent on the population of the Shopper DB 280 with shopper profile data that is aggregated for individual shoppers over time (i.e., multiple shopping trips). The Revisiting Shopper Identifier 260 can then be used to analyze an instance of shopper profile data to identify shoppers that have visited a retail location previously. If a shopper has visited before, then records for that shopper can be updated in the Shopper DB 280. New shoppers can have new shopper profile data created in the Shopper DB 280.

The Shopper Behavior Profiler 270 can then use shopper profile data from the Shopper DB 280 and a list of derivable metrics in order to classify shoppers. The metrics can include brand or store loyalty, shopping style, household income and size, and food preferences. Results of this process are then used to update the Shopper DB.

The complete set of shopper profile data, including the derivable metrics can then be used to filter shoppers, using the Shopper Filter 291, to create the anonymous shopper panel, using the Anonymous Panel Creator 290. The filtering can be performed using application-specific criteria to obtain the desired anonymous shopper panel. For example, a panel could be requested to be comprised of all shoppers that meet a particular age and income level, who have purchased a particular product from a store in the past, while also having previously browsed a particular product category.

More details for each module will be provided in later sections.

Shopper Profile Data

In this section, we describe the Shopper Profile Data (SPD) that can consist of a set of different types of information we collect and analyze from shoppers to enable the creation of anonymous panels. The SPD can further comprise three classes of data: Shopper ID Vector (SIV), Shopper Segment Data (SSD), and Shopper Behavior Dataset (SBD). FIG. 3 illustrates the Shopper Profile Data 300 components.

The Shopper ID Vector (SIV) 301 can refer to as a set of unique features that allow us to recognize a shopper among others. That includes a set of features that are unique over either long-term or short-term. The features of a shopper that are unique for a long-term basis (i.e., unique in multiple visits to stores over time) can include the face features and the MAC address of the radios of the mobile devices that the shopper carries. Such long-term unique features can be referred to as the Global ID Vector. The features that are unique only for a short-term basis (i.e., unique only during a single trip to a store) can include the body features such as body appearance. Such short-term unique features can be referred to as the Local ID Vector.

The Shopper Segment Data (SSD) 302 can be referred to as a set of features that can characterize a shopper so as to allow the shopper to be classified into a segment in the population. The SSD can be further bifurcated into the physical and behavioral segment data. The physical segment data can be extracted based on the physical characteristics of a shopper, including height, obesity, and demographics such as gender, age, and ethnicity. The behavioral segment data can describe a shopper's preference, tendency, and style in shopping, including brand loyalty, organic food preference, etc. The behavioral segment data is supposed to be derived from a set of measurements about the shopper, which is collected in the Shopper Behavior Dataset.

The Shopper Behavior Dataset (SBD) 303 can be a storage of all raw measurements and low-level metrics for a shopper. The low-level metrics, which can be called Shopper Metrics, can include per-week and per-month frequency of shopping visits to a store or to all stores, per-category and per-store time spent, per-category and per-store money spent, etc. The raw measurements for a shopper can be collected as a list of TripVector, where a TripVector of a shopper can be a collection of physical and contextual attributes of a shopper's single trip to a store and the Point-of-Sale (PoS) data. The physical attributes can describe the shopper's physical states, consisting of (1) a trajectory of a shopper, described by a tuple (t, x, y) and (2) the physical states of the shopper including gesture, head orientation, mobile device usage mode, etc. The contextual attributes can describe any interactions made between a shopper and the surrounding marketing elements of a store such as displays and items, for example, visual attention, physical contact, and more high-level various shopping actions including comparing products, reading labels, waiting in a line, etc.

At-Door Shopper Detector

The best place to capture a shopper's face in a retail store can be the entrance and exit area. Because all the shoppers should pass through a relatively narrow pathway and doors, their faces tend to be directed toward a single direction. Therefore, we can assume that at least a camera can be mounted around such entrance and/or exit area and capturing the shoppers' faces and body appearances.

Figure 4:
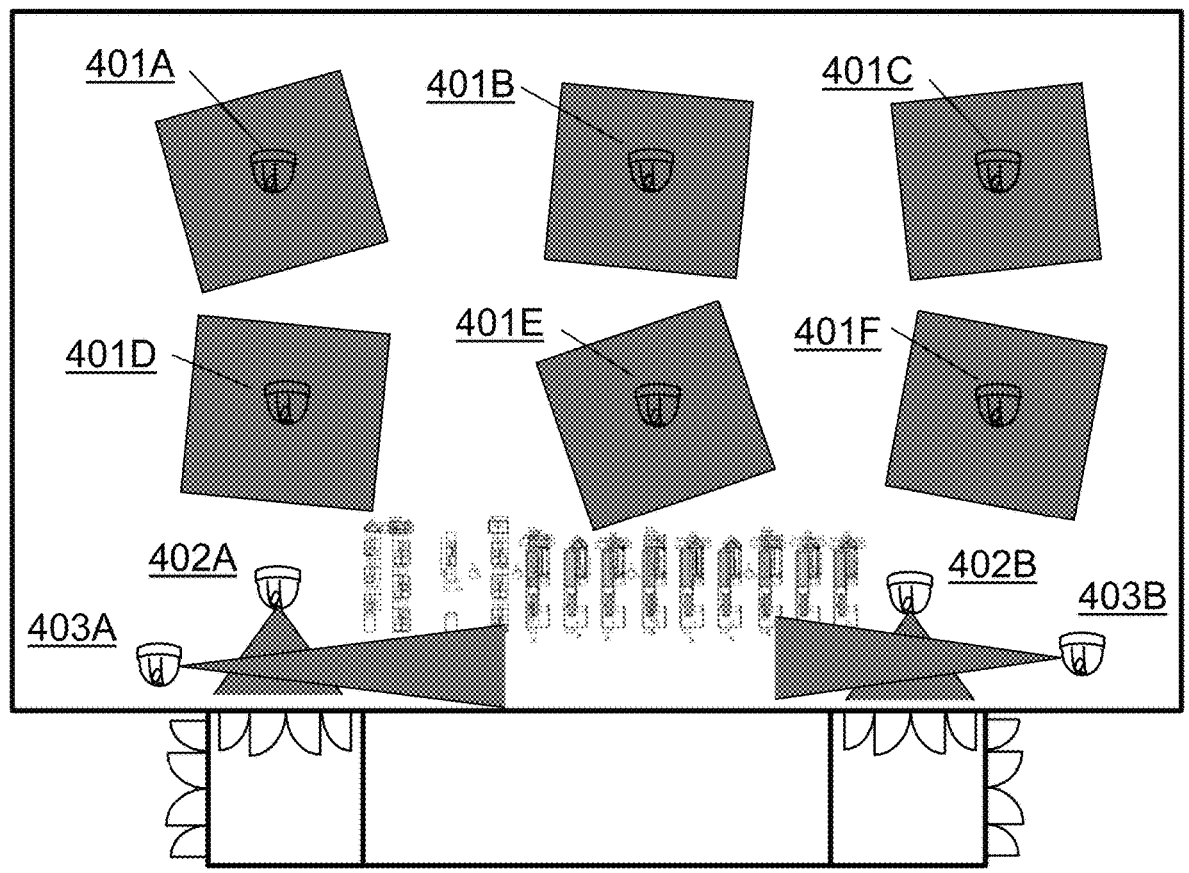
FIG. 4 shows an example of a sparse camera deployment.
Figure 5:
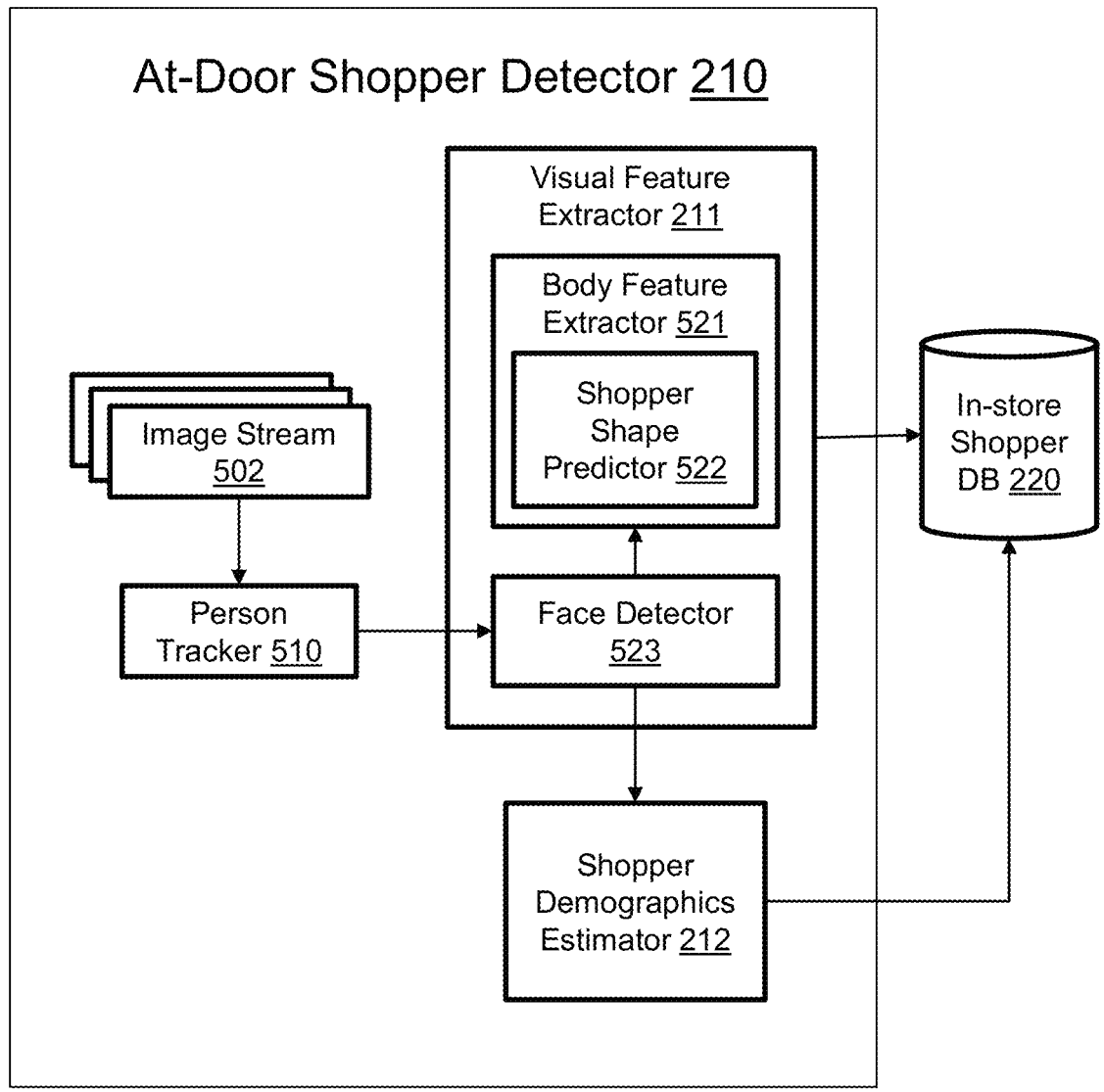
FIG. 5 shows an example block flow diagram of the At-Door Shopper Detector module.

FIG. 4 shows a sparse configuration camera deployment. In the sparse configuration, cameras 401A-F can capture non-overlapping portions of the retail store, and other cameras can be installed around the entrance and exit 402A-B and 403A-B. The cameras 401A-F, 402A-B, and 403A-B can be configured to capture a constant stream of images. FIG. 5 shows an example of the At-Door Shopper Detector 210. For each image frame from the Image Stream 502, the Person Tracker 510 module can search the image to find and track any person using a single or combined features like Histogram of Oriented Gradient (HOG), color histogram, moving blobs, etc. For each detected region where a person is likely to be present, the Face Detector 523 module can search to find a human face. The detection of a face can imply there is shopper present. For each detected face, if an instance of shopper profile data (SPD) has not been created for this tracked person yet, then the shopper's shopper profile data (SPD-1) can be created in the In-store Shopper DB 220. Note that the shopper profile data created can be labeled as SPD-1 since there are multiple modules that can create a shopper profile data. To distinguish such different shopper profile data, they can be labeled with different numbers. The detected face can then be added to the corresponding SPD-1 as a part of the Global ID Vector whether or not the SPD-1 is just created or already exists.

Upon detection of a face, the Body Feature Extractor 521 can also estimate the area of the shopper's upper and lower body using the Shopper Shape Predictor 522 based on the detected face location as a part of the Visual Feature Extractor 211. Then the Body Feature Extractor 521 can extract the body features of the shopper from the estimated shopper body area in the input image. The extracted body features can be added to the corresponding SPD-1 as a part of the Local ID Vector.

Once the tracking for a shopper in this module is completed, then all of the detected faces in the SPD-1 can be fed into the Shopper Demographics Estimator 212. The Shopper Demographics Estimator 212 can estimate the gender, age group, and ethnicity of the shopper based on the multiple faces and return back the estimation results with corresponding confidence level. The details of the Shopper Demographics Estimator 212 module will be further elaborated in the following section. The estimated demographics results can be updated into the physical segment data in the corresponding SPD-1, stored in the In-store Shopper DB 220.

Shopper Demographics Estimator

Figure 6:
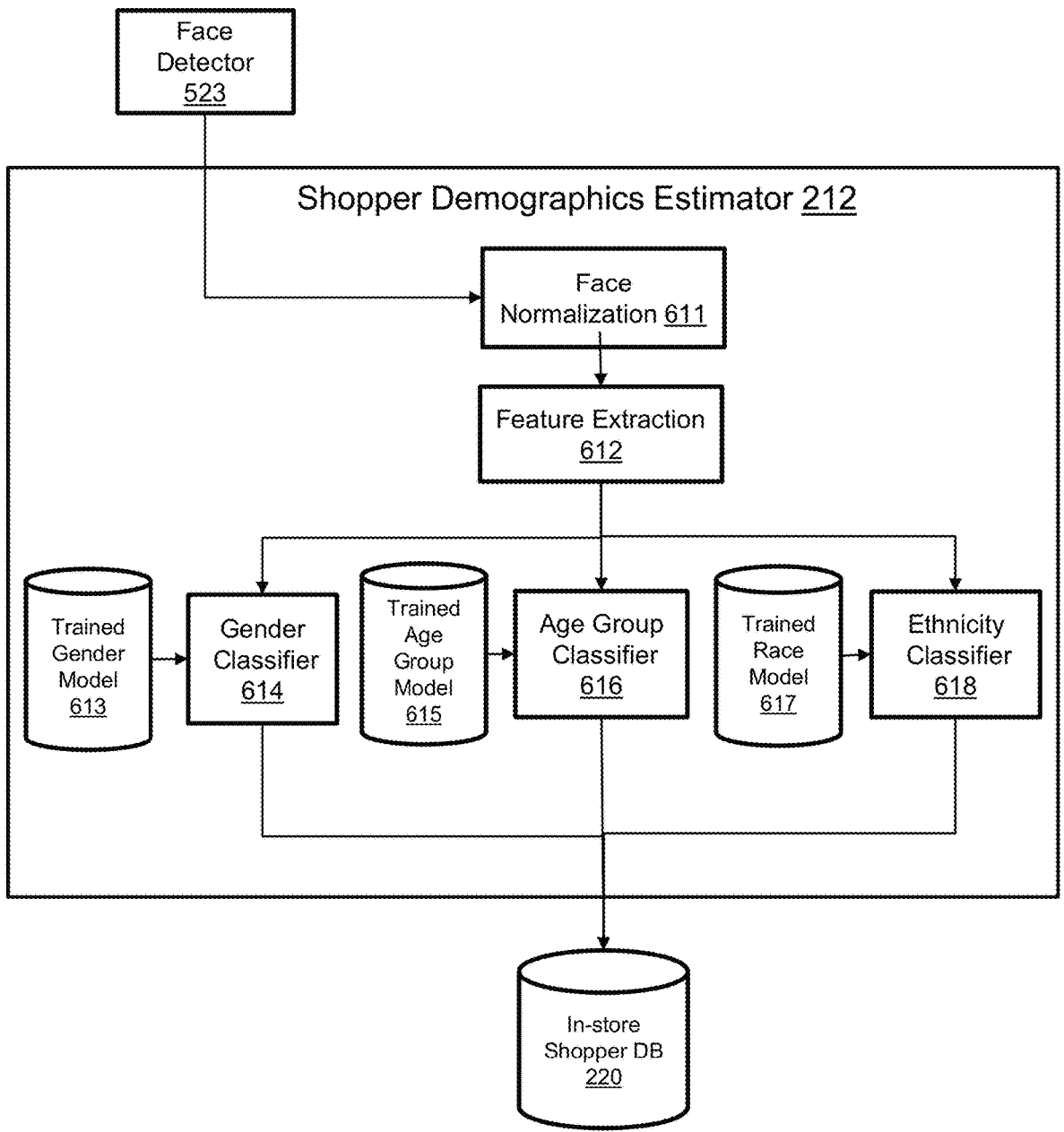
FIG. 6 shows an example block flow diagram of the Shopper Demographics Estimator module.

An example block flow diagram for the Shopper Demographics Estimator 212 is shown in FIG. 6. When a tracker is finished to track a shopper with a single or multiple face images (via the Face Detector 523), the Shopper Demographics Estimator 212 can result in three labels of demographics in terms of gender, age group, and ethnicity. For each label, it can have its own confidence value indicating how accurate the label output is.

For every face image, the Shopper Demographics Estimator 212 can have a major role to estimate the class label with a confidence value. This value can be used for aggregating the estimate of multiple face images with the same shopper ID by, for example, the weighted voting scheme.

The Shopper Demographics Estimator 212 can consist of three processes: Face Normalization 611, Feature Extraction 612, and classification in association with each demographics category such as gender (via the Gender Classifier 614), age group (via the Age Group Classifier 616), and ethnicity (via the Ethnicity Classifier 618). Exemplary details of each process is described as follows.

The Face Normalization 611 can be a process for normalizing the scale and rotation of a facial image to the fixed size and frontal angle. Like a preprocessor, this step can be necessary to associate an input image to the classifier model which is pre-trained with a fixed size and angle. For example, the scale and rotation parameters can be estimated by Neural Network which is trained from various poses and scales generated offline.

Next in the process, a proper feature, such as gray-scaled intensity vector, color histogram, or local binary pattern, can be extracted from the normalized face using the Feature Extraction 612 module. The extracted feature can be given for an input of each demographics classifiers.

Then, classification for each category can be done by help of the pre-trained model (utilizing the Trained Gender Model 613, Trained Age Group Model 615, and Trained Race Model 617) such as the Support Vector Machine which can provide the optimal decision boundary in the feature space. In this case, the final decision can be determined based on a confidence value that is computed on the closeness to the decision boundary in the feature space. Likewise, the confidence value can be decreased as the input is getting closer to the decision boundary.

Lastly, if multiple faces are available to a tracked shopper, the weighted voting can be straightforwardly applied to determine the final demographics labels. The output of the Shopper Demographics Estimator 212 can be saved in the In-Store Shopper DB 220 as updated shopper profile data (SPD-1). In another embodiment, a face fusion-based approach may be employed before determining the final demographics label, which fuses multiple faces into a single representative face by, for example, averaging the faces.

Multi-Modal Shopper Tracker

Multi-modal shopper tracker 230 can consist of two individual shopper trackers with different modalities: vision-based shopper tracker (which will be referred to as the Vision Tracker 231) and mobile signal-based shopper tracker (which will be referred to as Mobile Tracker 232). Each shopper tracker can track shoppers and produce shopper trajectories independently and later their shopper trajectories can be integrated in the Multi-modal Shopper Data Associator 240 module for the same shoppers.

Although the algorithms and methods are described with respect to Wi-Fi signal-based tracking, it should be understood that the mobile signal-based tracking can be applied and extended to other mobile signals such as Bluetooth.

1. Vision Tracking

For vision-based tracking 231, a set of cameras can be deployed in an area of interest where the sensing ranges of the cameras 104 A-D as a whole can cover the area with a level of density as shown in FIG. 1.

The cameras can be deployed in such a way that the sensing range of a camera does not have to be partially overlapped with that of other cameras. Any target that comes out of a camera view and enters in another camera view can be associated by the in-store shopper re-identifier. Each single camera can run the vision-based tracking algorithm.

Vision-Based Tracking Algorithms

Figure 7:
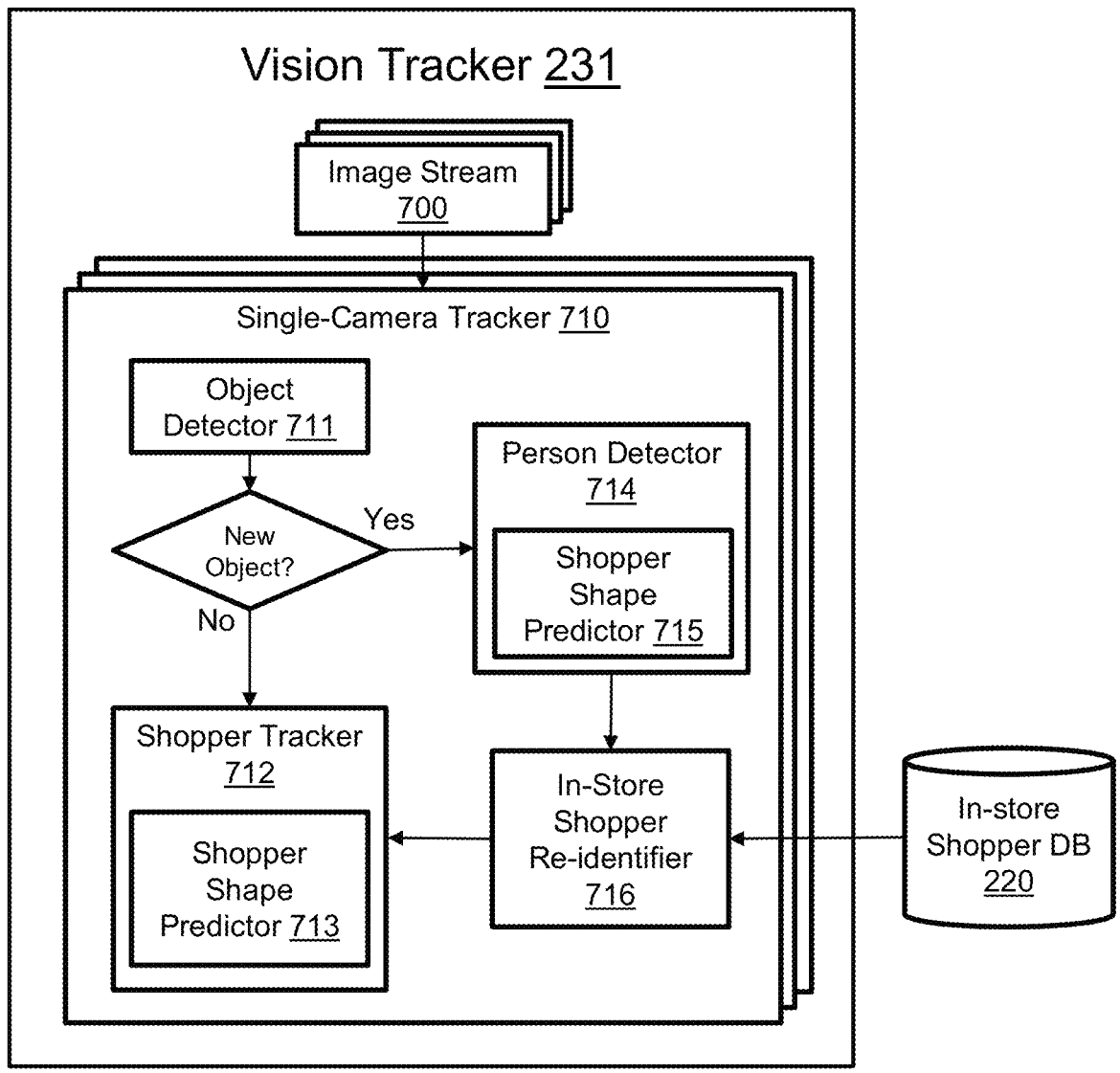
FIG. 7 shows an example block flow diagram of the Vision Tracker module.
Figure 8:
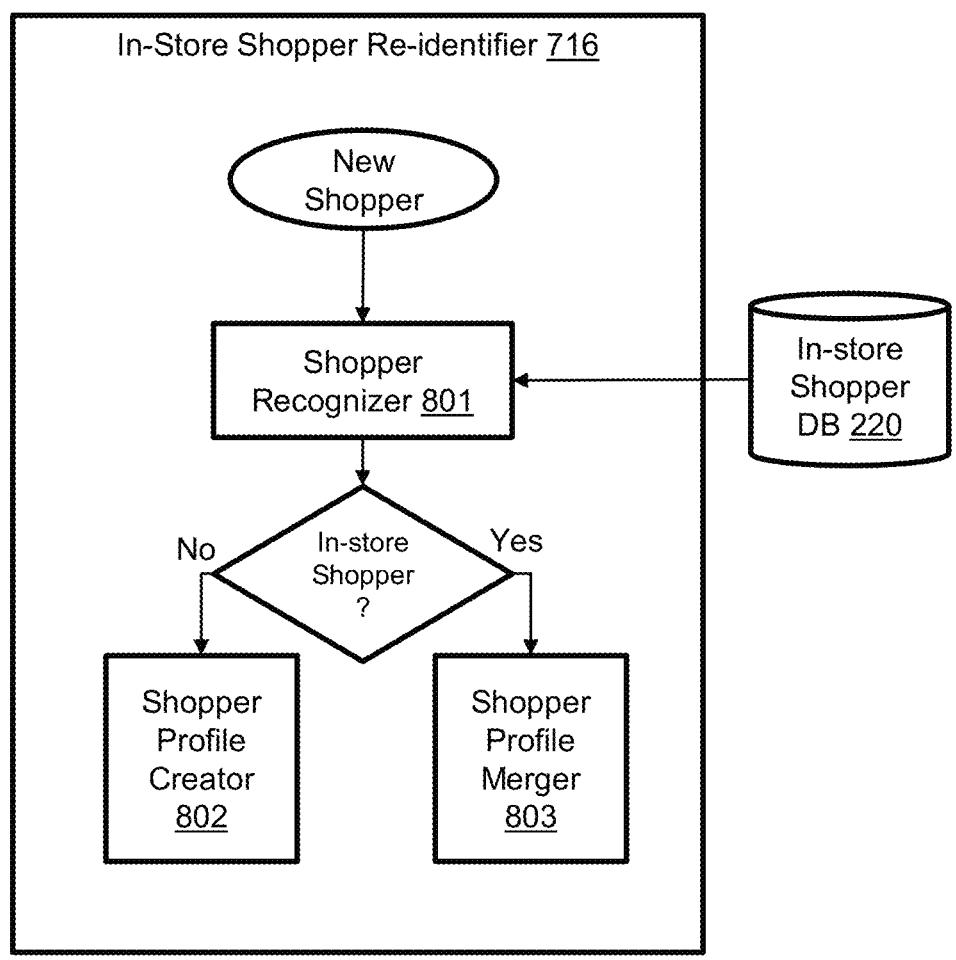
FIG. 8 shows an example block flow diagram of the In-Store Shopper Re-identifier module.

FIG. 7 shows an exemplary embodiment for the vision-based tracking 231 method. The image stream 700 from deployed cameras 104 A-D can be given to the Object Detector 711 module. The Object Detector 711 can then detect any blobs that constitute foreground activity and can create a list of foreground blobs. An embodiment of the object detector could be using a background subtraction algorithm. After that, the Shopper Tracker 712 can update the list of the existing shopper tracks (which includes time and estimated locations of the shoppers) for the new image frame. In the Shopper Tracker 712, each tracker for an existing shopper can make a prediction on the shopper location for the new image frame. For each predicted shopper location, the Shopper Shape Predictor 713 can first predict the shape of the shopper based on the predicted shopper location and the pre-learned camera calibration (calibration process is described in the Sensor Calibration section below) parameters. The camera calibration parameters can be used to back-project the shopper shape onto the camera image plane. Then, a search window around the predicted shopper shape can be defined, and the location of the target in the search window can be determined by finding the best matching regions to the existing target feature. For example, a mean-shift tracker with HSV-based color histogram can be used to find the precise location of the updated target. The new target location can be used to update the target states of the tracker and thus to update the corresponding shopper profile data (SPD-2) in the In-store Shopper DB 220. Any blob detected in the Object Detector 711 that overlaps with the updated target tracks can be considered existing target activity and excluded from considering newly detected targets. For any remaining blob, it can run the Person Detector 714 to confirm the newly detected blob is a shopper blob. In the Person Detector 714, the Shopper Shape Predictor 715 can be used to generate a predicted shopper shape on the camera image plane at the blob location on the image using the pre-learned camera calibration parameters. A potential shopper around the detected blob can be found using the predicted shopper shape mask. The body features of the found shopper region can then be extracted based on the predicted shopper shape on the camera image plane and can be determined using a classifier if the blob is a human blob. If so, then a new shopper profile data can be created.

In a case where a same shopper is tracked by multiple cameras at the same time due to their overlapping field of view, the cameras may collaborate together to fuse the measurements about the same shopper from different cameras by exchanging the measurements, including the location and the extracted visual features. Such collaborative multi-camera tracking could generate a single and merged trajectory for a shopper over the multiple cameras with the same shopper profile data (SPD-2). This can be made possible by using the pre-learned camera calibration information that enables the back-projection of the same physical points onto different cameras. Given an assertion that different cameras are tracking the same shopper and potentially with a camera clustering algorithm, the shopper tracking information estimated from a camera (e.g., a cluster member camera) can be handed over to the tracker that runs on another camera's images (e.g., a cluster head camera). Besides such measurement fusion-based multi-camera tracking, in another embodiment, a trajectory fusion-based multi-camera tracking approach may be employed, which combines multiple trajectories about the same shopper that is created individually from different cameras.

The In-store Shopper Re-identifier 716 then can compare the newly created shopper profile data (SPD-2) with the existing shopper profile data (SPD-2) stored in the In-store Shopper DB 220 to see if there is any existing shopper profile data (SPD-2) that has the matching body features. If the newly created shopper profile data (SPD-2) matches existing shopper profile data (SPD-2), then it can retrieve the existing shopper profile data from the In-store Shopper DB 220. If the newly created shopper profile data (SPD-2) does not match to any existing shopper profile data (SPD-2), it can create a new shopper profile data (SPD-2) in the In-store Shopper DB 220 and also can instantiate a new target tracking instance in the Shopper Tracker 712.

In-Store Shopper Re-Identifier

In each camera, when a new human blob is detected, the In-store Shopper Re-identifier 716 can search for a matching shopper profile data from the In-store Shopper DB 220. Identifying the corresponding shopper profile data from the In-store Shopper DB 220 can be carried out by the Shopper Recognizer 801 using a classification algorithm. An embodiment of the Shopper Recognizer 801 can include the visual feature representation of the human blob and classification algorithm. The visual features should be invariant to the variations in the appearance and motion of the targets in different view in order to handle the case of random target movement and pose change. Such visual features can include color histogram, edges, textures, interest point descriptors, and image patches. Classification algorithms can include support vector machine (SVM), cascade classifier, deep-learning based neural networks, etc. If an existing shopper profile data is found, then it can be retrieved from the In-store Shopper DB 220, and merged with the new shopper profile data using the Shopper Profile Merger 803. If there is no matching shopper profile data, then a new temporary shopper profile data (SPD-2) can be created by the Shopper Profile Creator 802, and stored in the In-store Shopper DB 220.

2. Wi-Fi Tracking

FIG. 1 shows an exemplary embodiment for Wi-Fi sensor deployment. For Wi-Fi based tracking, we can also assume that a set of Wi-Fi signal sensors 106 A-C, which will also be referred to as access points or simply APs, can be deployed in an area of interest where the sensing range of the set of APs 106 A-C can cover the area with a certain sensing density p, where the sensing density p is defined as the level of overlap of the sensing range of the APs 106 A-C of the area. If an area is covered by APs 106 A-C with a density p, then it can mean that any point in the area is covered by at least p number of APs at any time. The value of p can be determined differently depending on the employed algorithms and environments. For example, for trilateration based Wi-Fi device localization schemes, p could be at least three while for triangulation based ones, p could be at least two. In a preferred embodiment where trilateration can be used as a localization method, the APs 106 A-C are usually deployed with the value of p being four, which is empirically determined to be a balanced tradeoff between cost and robustness.

Figure 9:
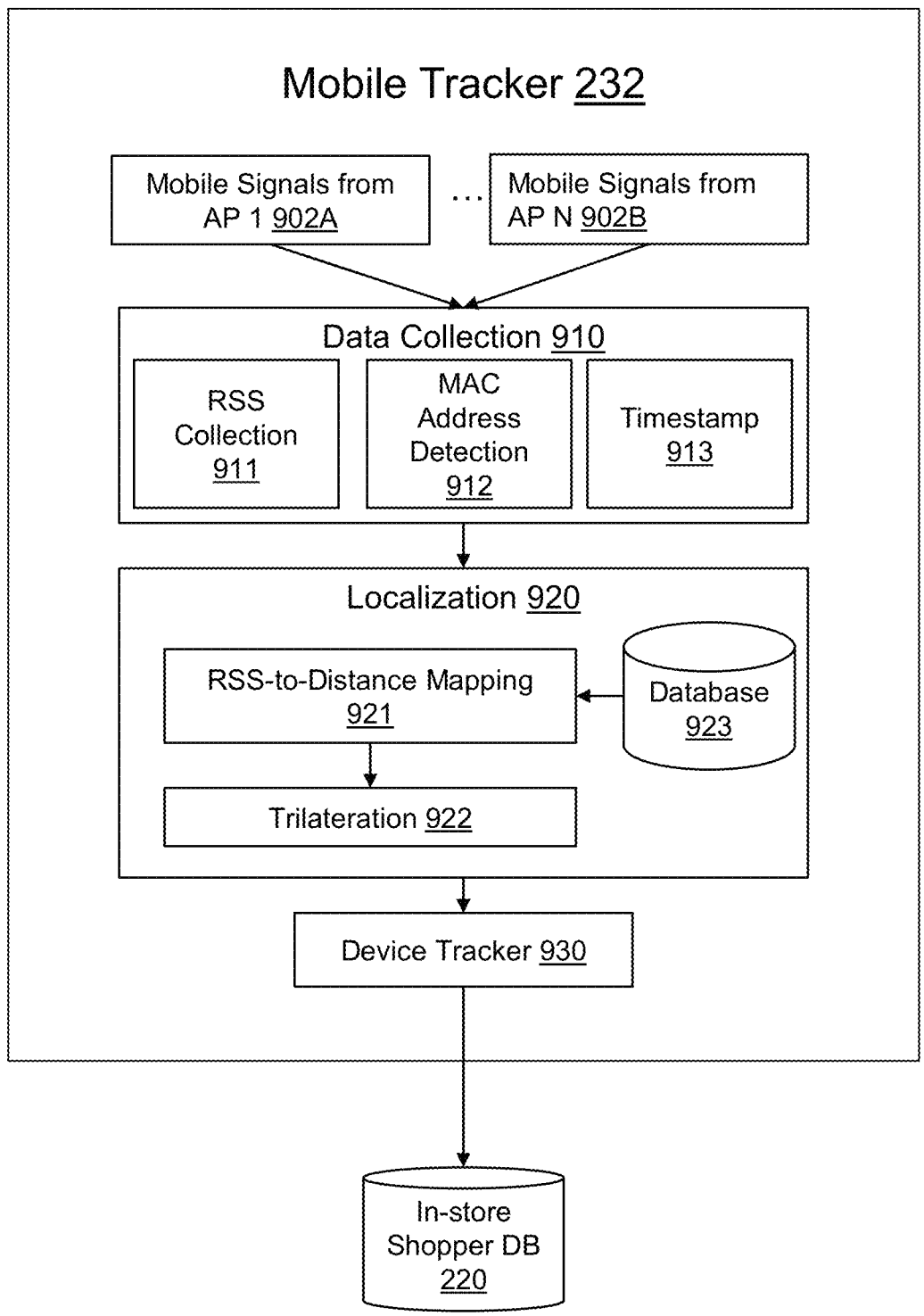
FIG. 9 shows an example block flow diagram of the Mobile Tracker module.

The deployed APs 106 A-C can be calibrated (calibration process is described in the Sensor Calibration section below) in terms of Received Signal Strength-to-distance, RSS-to-distance, or radio fingerprint-to-location mapping. Both RSS-to-distance and radio fingerprint-to-location mapping are methods well-known in the art. FIG. 9 shows an exemplary block flow diagram of the Mobile Tracker 232 module. In one embodiment, localization 920 can be calculated using an RSS-to-distance mapping 921. Due to the wireless signal propagation characteristics, the power of the signal decreases as the source of the signal gets farther. The relationship between the RSS and the distance from the source can be estimated by constructing a mapping function based on a set of ground truth measurements. Using the RSS-to-Distance Mapping 921 function, a trilateration-based localization 922 can be performed if there are at least three RSS measurements available for a person at a given time instant. The RSS-to-Distance Mapping 921 may be learned without any prior data if a self-calibration method is employed, which takes advantage of already-known locations of APs and their signals that are stored in a Database 923. In another embodiment, a radio fingerprint for an area of interest can be generated using a set of measurements from multiple APs for a Wi-Fi source at known positions. The radio fingerprint-to-location mapping can be used to localize a source of Wi-Fi signals.

Wi-Fi Based Tracking Algorithms

A computing machine and APs 106 A-C can track the mobile signals 902 A-B of persons of interest in the Mobile Tracker 232 module. Given N number of APs 106 A-C deployed in an area of interest with a certain density p, each AP can be constantly searching for wireless signals 902 A-B of interest in a certain channel or multiple channels simultaneously if equipped with multiple radios. The AP with a single radio may hop over different channels to detect such wireless signals 902 A-B that could be transmitted from mobile devices present in the area. APs 106 A-C can search for wireless signals 902 A-B because mobile devices are likely to look for an AP for potential connection that may be initiated in the near future if the user of the mobile device attempts to use a wireless connection.

To get and maintain a list of nearby APs 106 A-C, most mobile devices 102 usually perform a type of AP discovery process if the wireless transmitter is turned on. The mobile devices tend to transmit a short packet periodically (i.e., Probe Request in the 802.11 standard) with a certain time interval between transmissions to discover accessible APs nearby. The time interval depends on (1) the type of the operating system (OS) of the mobile device (e.g., iOS, Android, etc.), (2) the applications that are currently running actively or in background, and (3) the current state of the mobile device, for example, whether the display of the mobile device is on or off. In general, if the display of a mobile device is on, then the OS puts the device in an active state, resulting in the interval getting shorter and transmission rate being increasing. If the display is off, then the OS would gradually putting the device into a sleep state through multiple stages.

Once a packet is transmitted from a mobile device 102 via wireless communications or mobile signals 902A-B, then a subset of APs 106 A-C can detect the packet around the mobile device if the APs happen to be listening at the same or an adjacent channel. The APs 106 A-C at an adjacent channel may be able to detect the packet since a Wi-Fi channel spectrum spans wider than the frequency width allocated for a channel. When a packet is detected at an AP 106 A-C, a data collection 910 process can occur where the PHY layer and MAC layer information of the packet can be retrieved which can include the Received Signal Strength (RSS) 911, MAC address 912, and a timestamp 913 of the packet transmission of the sender. The value of the RSS may be available in terms of the RSS Indicator (RSSI), and this value may vary significantly even during a short time period due to various signal distortions and interferences. To reduce such noise and variation the RSS values can undergo a noise reduction process during a set of consecutive receptions. In case of multiple mobile devices present, the unique MAC address 912 or ID of mobile devices 102 can be used to filter and aggregate the measurements separately for each individual mobile device.

In the localization 920 method where RSS-to-Distance Mapping 921 can be used, the values of the RSS readings can be converted to a real-world distance from each AP 106 A-C by utilizing the pre-learned RSS-to-Distance Mapping 921 function for each AP 106 A-C, which could be stored in a database 923. If there are distance measurements from at least three different APs 106 A-C available, then a single location can be estimated by employing a trilateration-based approach 922. The estimated current location can then be fed into a tracker (e.g., Kalman filter and Particle filter) with the unique ID, the MAC address 912, so that the optimal current location and thus trajectory can be estimated in a stochastic framework in the mobile Device Tracker 930 module. The trajectory can then be stored in the In-store Shopper DB 220 as shopper profile data (SPD-3) with the specific MAC address.

Multi-Modal Shopper Data Associator

In this section, all of the independently made shopper profile data from different tracking modules can be associated and integrated through the Multi-modal Shopper Data Associator 240 module.

1. Multi-Modal Trajectory Fusion

Figure 10A:
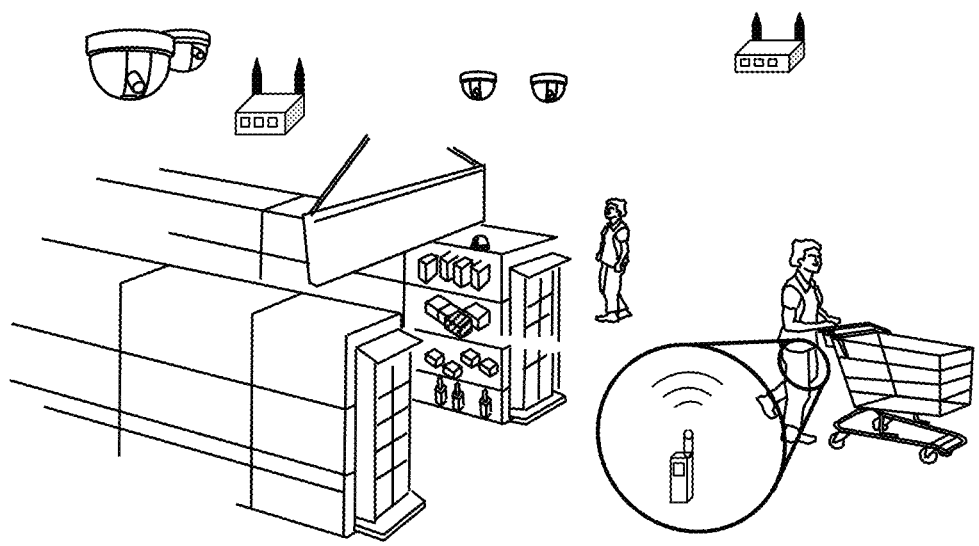
FIGS. 10A-C show an example of person tracking and the resulting vision and Wi-Fi trajectories.
Figure 10B:
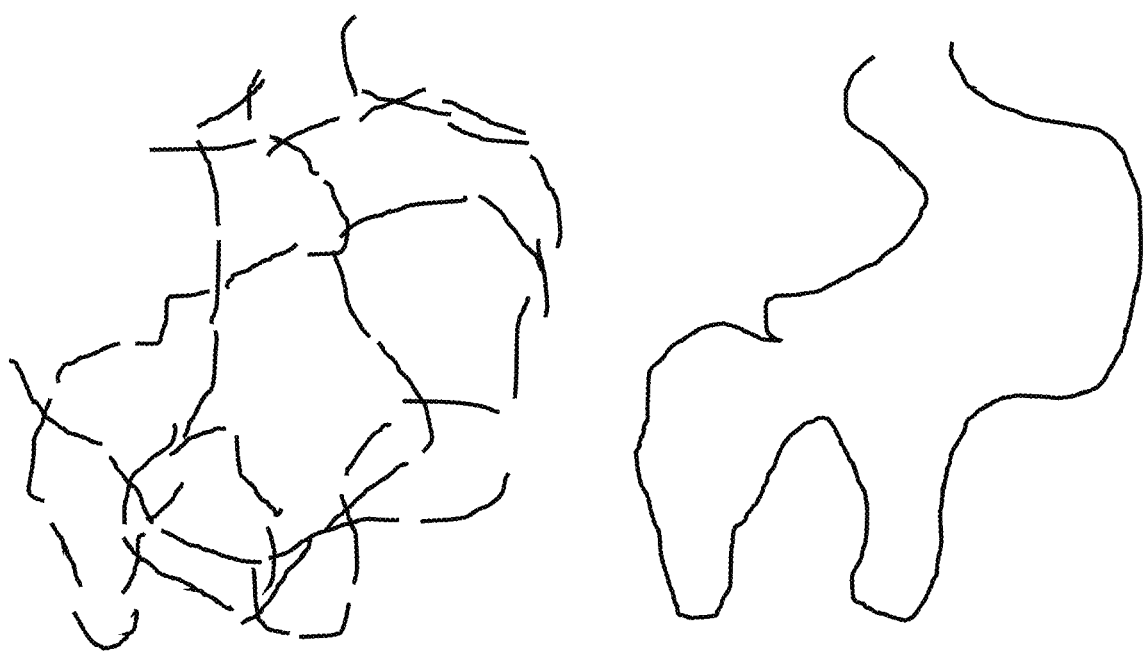
Figure 10C:
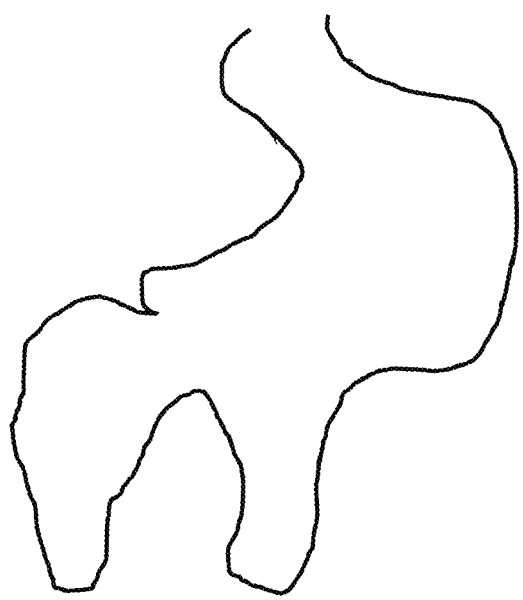

FIGS. 10A-C show an example of the tracking results from vision-based tracking and mobile signal based tracking. FIG. 10A shows an example of person being tracked with her mobile device by vision and Wi-Fi sensors as described in FIG. 1. FIG. 10B reveals an example of tracking said person through vision sensors. The vision tracking can yield many trajectory fragments. Due to the dynamic nature of visual features of the same person in different environmental conditions, it is highly likely that the trajectories of the single person that are generated using vision-based tracking (which will be referred to as the vision-based trajectories or simply VTs) are possibly fragmented into multiple segments of partial trajectories due to potential tracking failures. In case of multiple persons in the same area, it is usually challenging to determine which VTs correspond to which persons. In spite that it can be difficult to associate the same ID for a longer period of time across different cameras especially when there are cluttered backgrounds or visually-similar irrelevant objects nearby, the vision-based tracking can provide high-resolution and accurate tracking. FIG. 10C shows an example of tracking said person using Wi-Fi sensors. The resulting trajectory is consistent and unbroken. However, Wi-Fi based trajectories (which will be referred to as the Wi-Fi based trajectories or simply WTs) resulting from the mobile trajectory generation can suffer from low sampling frequency and low spatial resolution although it is featured by a unique and consistent ID.

Figure 11:
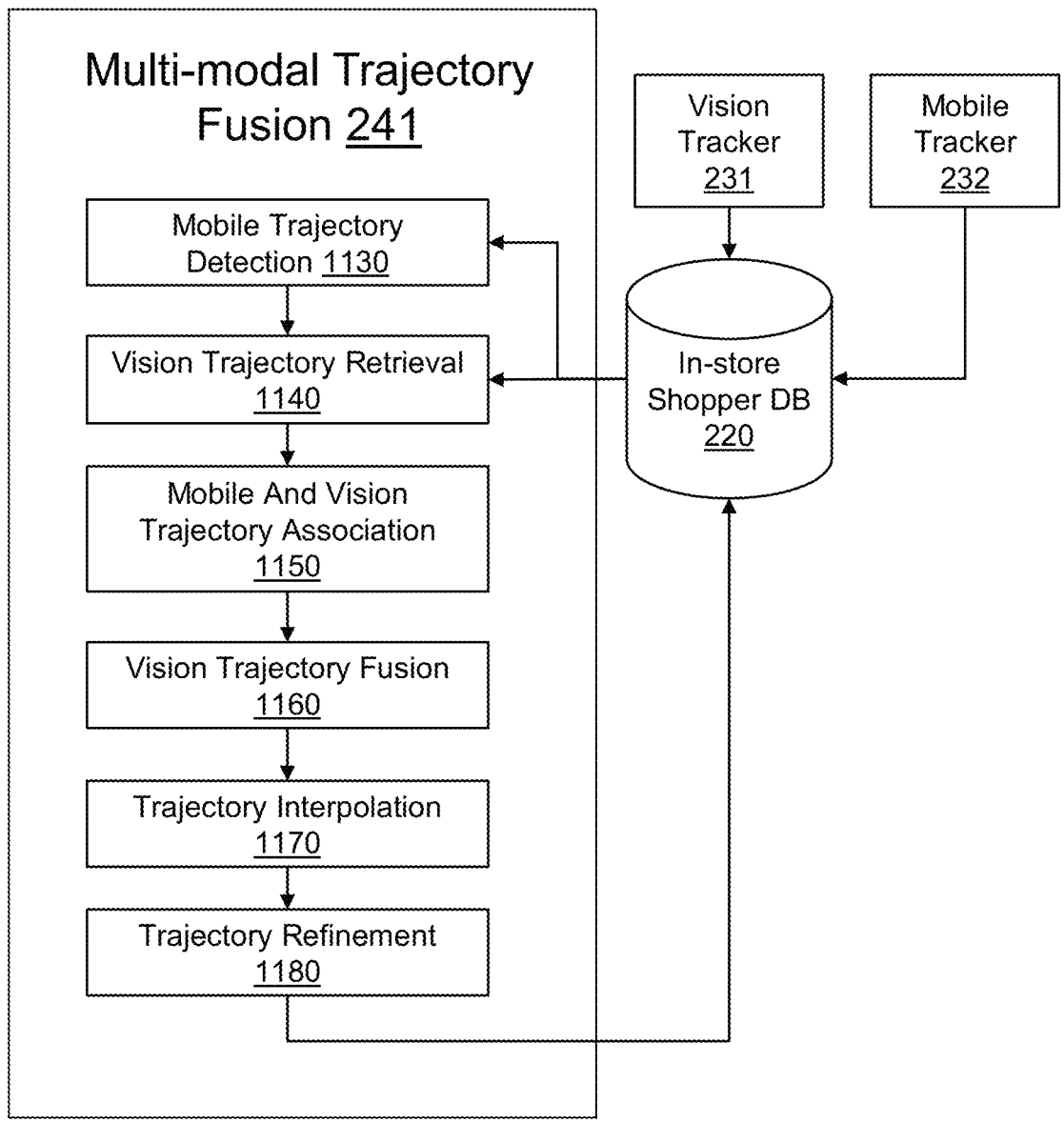
FIG. 11 shows an example block flow diagram of the Multi-Modal Trajectory Fusion module.

FIG. 11 shows an exemplary embodiment of the Multi-modal Trajectory Fusion 241 process. By combining these two approaches using the Multi-modal Trajectory Fusion 241 approach in a preferred embodiment of the present invention, multiple persons can be tracked more accurately in terms of localization error and tracking frequency and more persistently than would be possible by a single Wi-Fi or vision based tracking.

Given that a set of cameras 104 A-D and APs 106 A-C are deployed capturing measurements in an area of interest, the Mobile Tracker 232 module may detect when a person 100 carrying a mobile device 102 with its wireless transmitter turned on (which will be referred to as a mobile-carrying person) enters the area by detecting radio traffic from a new source and/or by confirming that the source of radio traffic enters a region of interest. Upon the detection of the entrance of a new mobile-carrying person, the system can track the mobile-carrying person within the region of interest (e.g., the retail space of a mall). The Mobile Tracker 232 module can also detect the exit of the mobile-carrying person by detecting an event in which the period that the radio traffic is absent is longer than a threshold of time and/or the source of the radio traffic exits the region of interest. The trajectory in between the entrance and exit of the mobile-carrying person can be inherently complete and unique due to the uniqueness of the MAC address of the mobile device.

Independent of the mobile signal-based tracking, any person who enters the area where a set of cameras are deployed may be tracked by each individual camera 104 A-D or by the multiple cameras 104 A-D collaboratively possibly while forming a cluster among them in the Vision Tracker 231 module. A person can be persistently tracked with a certain level of uncertainty if there are no significant visually similar objects in the same field of view of the cameras resulting in a longer trajectory or more persistent tracking. Whenever a tracking failure occurs due to cluttered background or visually similar irrelevant objects, the trajectory may be discontinued, and the tracking may be reinitiated. Since the re-identification of the person may or may not be successful during the entire trip of the person within the area, multiple disjointed trajectories may be created for the same person across the trajectories. The tracking results can then be stored in the In-Store Shopper DB 220. In an embodiment, the tracking results may be in the form of a tuple of (x, y, t) with associated uncertainty or in the form of a blob data with its timestamp and visual feature vector.

Figure 12A:
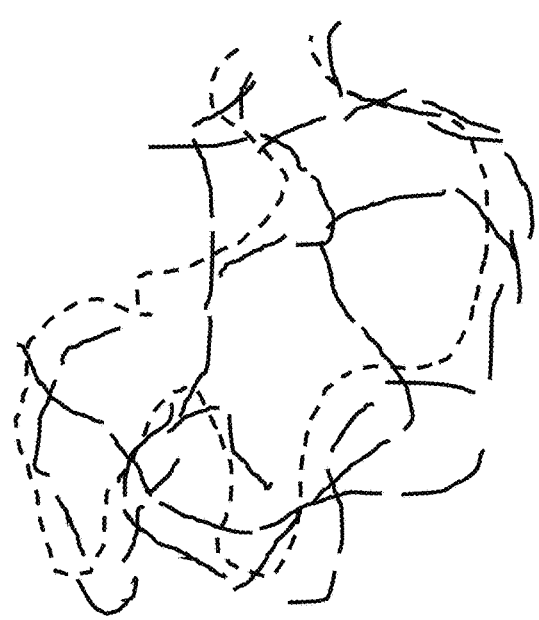
FIGS. 12A-D show an example of the multi-modal trajectory fusion process for vision and Wi-Fi trajectories.
Figure 12B:
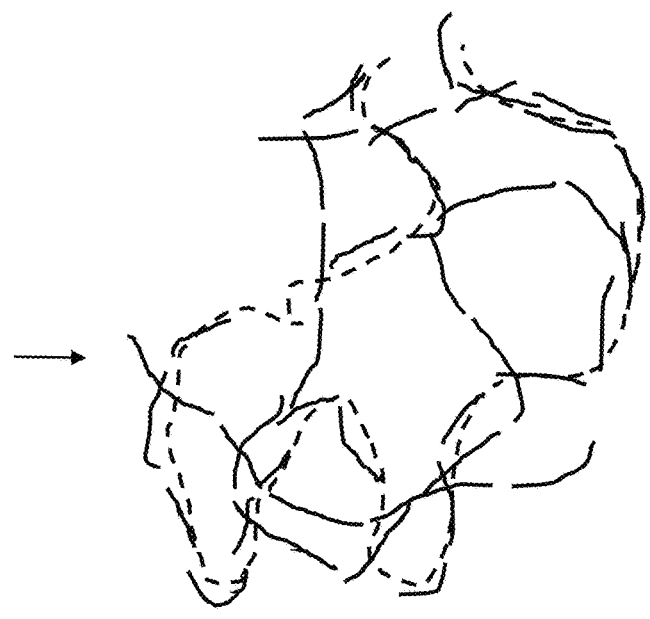
Figure 12D:
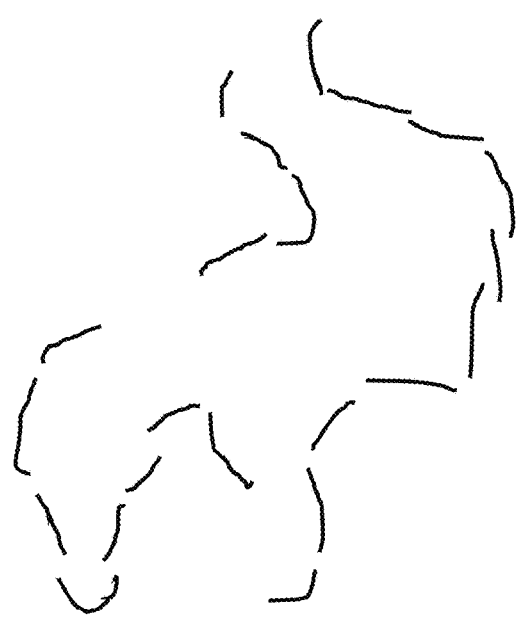
Figure 12C:
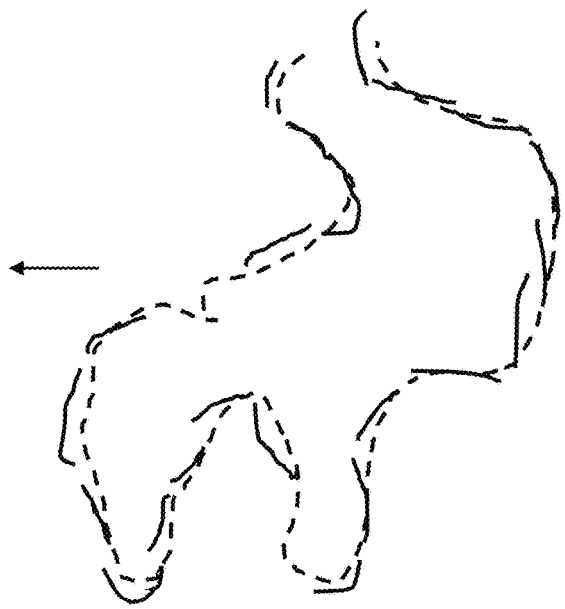

Once the complete Wi-Fi based trajectory of a mobile-carrying person (i.e., a WT as defined earlier, stored as SPD-3) is generated by the Mobile Tracker 232 module and retrieved from the In-Store Shopper DB 220 by the Mobile Trajectory Detection 1130 module, the system can identify and retrieve from a database the vision-based trajectories of persons (i.e., VTs as defined earlier, stored as SPD-2), using the Vision Trajectory Retrieval 1140 module, that are generated during when the WT is generated. These VTs can form the pool of the candidates that potentially correspond to the WT. Then, a set of VTs can be identified among the pool of the candidates by comparing the distance statistics of the VTs to the WT of the mobile-carrying person and also comparing the motion dynamics including direction and speed. This process assumes that the WT is an approximate of the actual trajectory of the mobile-carrying person and makes use of the WT as an anchor. Once the VTs (SPD-2) corresponding to the WT (SPD-3) is identified, then the unique ID of the WT can be assigned to the set of VTs, creating a new shopper profile data (SPD-4) that combines the matching VTs (SPD-2) and the WT (SPD-3). This process of identifying a set of VTs that corresponds to a WT can be called Mobile and Vision Trajectory Association 1150. FIGS. 12A-D show a detailed example of the Mobile and Vision Trajectory Association 1150. In FIG. 12A, a set of potential VT candidates can be overlaid on the WT, which is represented by the dashed line. FIG. 12B shows an example of an initial matching process between the VT candidates and the WT. FIG. 12C shows an example of the matched VTs and the WT, which are then assigned to each other with a unique identification, resulting in the exemplary trajectories shown in FIG. 12D.

The VTs in SPD-4 with the assigned unique ID can then be used as the primary source to reconstruct the trajectory of the mobile-carrying person since they can be more accurate than the WT. The identified VTs (which are actually a set of fragmented VTs for a single person) can then be combined together to generate a single trajectory in case there are multiple vision measurements for the same target at the same time instance. In an embodiment, a Kalman or Particle filter may be used to combine multiple measurements. This process of integrating multiple VTs to reconstruct a single trajectory can be called Vision Trajectory Fusion 1160.

Vision measurements may not be available for longer than a threshold due to various reasons because, for example, (1) some of the correct vision measurements may be discarded in the ID association process, (2) some of the cameras may not be operated correctly, (3) the background may be changed abruptly, (4) some regions are not covered by any camera, etc. In such cases, the combined trajectory that is constructed only from the vision measurements may have missing segments in the middle. The missing segments can be reconstructed by retrieving the missing segment from the WT stored in the database since the WT has the complete trajectory information although its accuracy may be relatively low. This process can be called Trajectory Interpolation 1170. Since the point-to-point correspondence between WT and VTs can be found in the Mobile and Vision Trajectory Association 1150 process, the exact segments in the WT corresponding to the missing segments can be identified. The found segments in the WT can be excerpted and used to interpolate the missing parts of the combined trajectory resulting in a single and complete final trajectory (which will be referred to as the fused trajectory or simply FT). It can be made possible since in nature the WT is a complete trajectory of the person albeit with a low resolution.

The above Trajectory Interpolation 1170 process assumed that a Wi-Fi trajectory (i.e, WT) can be generated with a low sampling frequency, yet it may be the case that there are multiple long periods of time where no Wi-Fi measurements are received. In practial cases, the pattern of Wi-Fi signal emission from a mobile device is a burst of multiple packets often followed by a long period of sleep due to the energy conservation schemes in the operating system of the mobile device. Thus, it is often the case that there are multiple periods where no Wi-Fi signals are detected for longer than, say, 30 seconds, resulting in missing holes in Wi-Fi trajectories.

In an embodiment, such missing holes may be estimated and interpolated by taking into account both the store layout and the other shoppers' trajectories in a database by inferring the most probable path taken using a learning machine and based on the other shoppers who followed the similar path of the shopper that are actually measured before and after the missing parts of the trajectory.

Once the Trajectory Fusion and Interpolation process is completed, we may further refine the final trajectory taking into account the store floor plan and layout that describes the occupancy map of the fixtures and other facilities/equipments where shopper trajectories must not exist. In an embodiment, a shopper trajectory may be modified in such a way that it detours such obstacles with a shortest trip distance. If there are multiple such detours are available which has similar trip distances, the past history of other shoppers may be utilized to estimate more preferred and likely path that the shopper may take. This process can be called Trajectory Refinement 1180. The results of this process can be new shopper profile data (SPD-4), which can then be used to update the In-store Shopper DB 220.

2. Shopper Data Association

Figure 13:
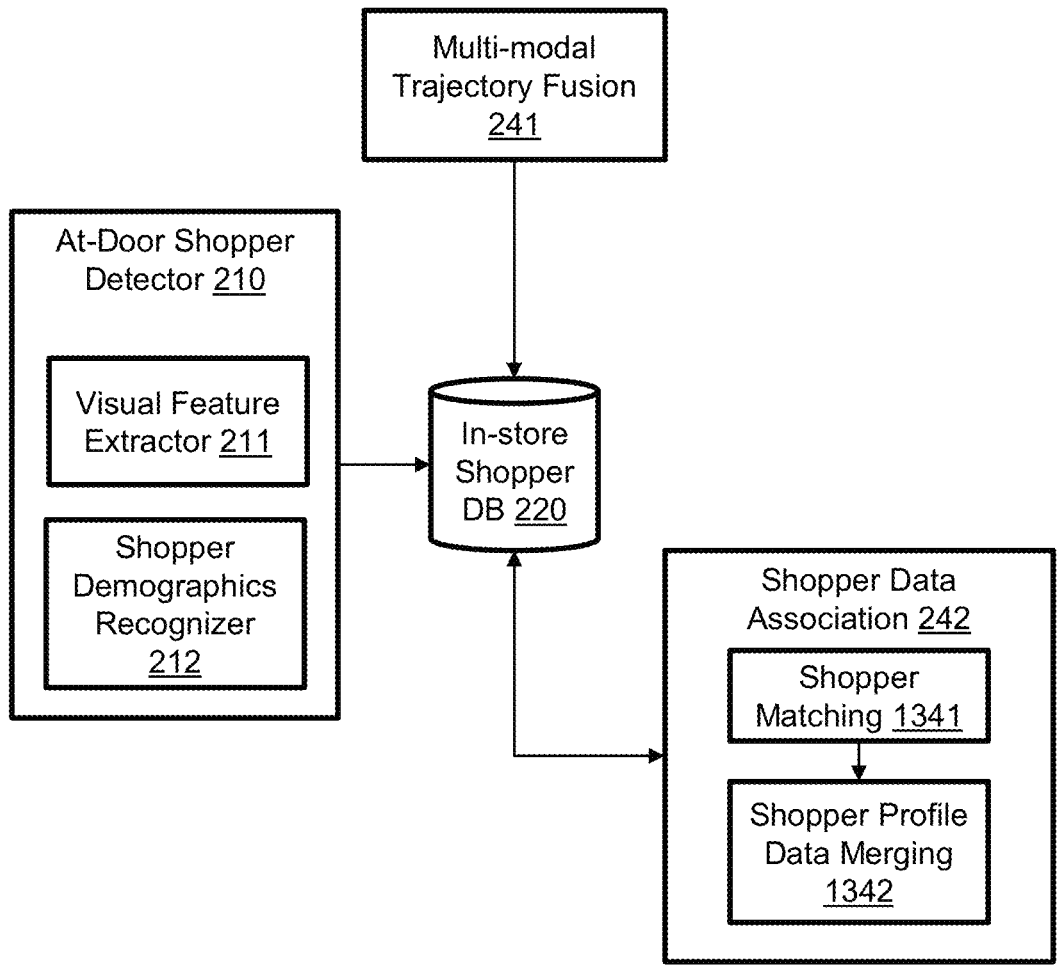
FIG. 13 shows an example block flow diagram of the Shopper Data Association module.

FIG. 13 shows an example of the Shopper Data Association 242 module. This process can merge the shopper profile data (SPD-1) from the At-Door Shopper Detector 210 with the shopper profile data (SPD-4) from the Multi-modal Trajectory Fusion 241 process creating a new shopper profile data (SPD-5) that can be stored in the In-Store Shopper DB 220.

Upon the creation of the shopper profile data (SPD-4) from the Multi-modal Trajectory Fusion 241, the Shopper Matching 1341 step can retrieve a set of shopper profile data (SPD-1) from the In-Store Shopper DB 220 that were created at about the same time when the shopper corresponding to the SPD-4 entered or exited the retail space. Given the set of candidate matching SPD-1 to the SPD-4, the similarity of the visual features (for example, but not limited to, face and body features) and other available shopper data (for example, but not limited to, existing estimated demographics data) between them can then be computed during the Shopper Matching 1341 step. The similarity computation can be performed using any number of algorithms that would be well-known by one skilled in the art, including color histogram-based matching, texture-based matching, etc. For each instance of the shopper profile data (SPD-4) from the Multi-modal Trajectory Fusion 1310 module, the best matching (i.e., most similar) At-Door Shopper Detector 1320 data instance can be identified. The Shopper Profile Data Merging 1342 step can then combine the identified shopper profile data (i.e., the matching pair of SPD-1 and SPD-4) to create a new shopper profile data (SPD-5) that can be stored in the In-Store Shopper DB 220.

3. Trajectory-Transaction Data Association

Figure 14:
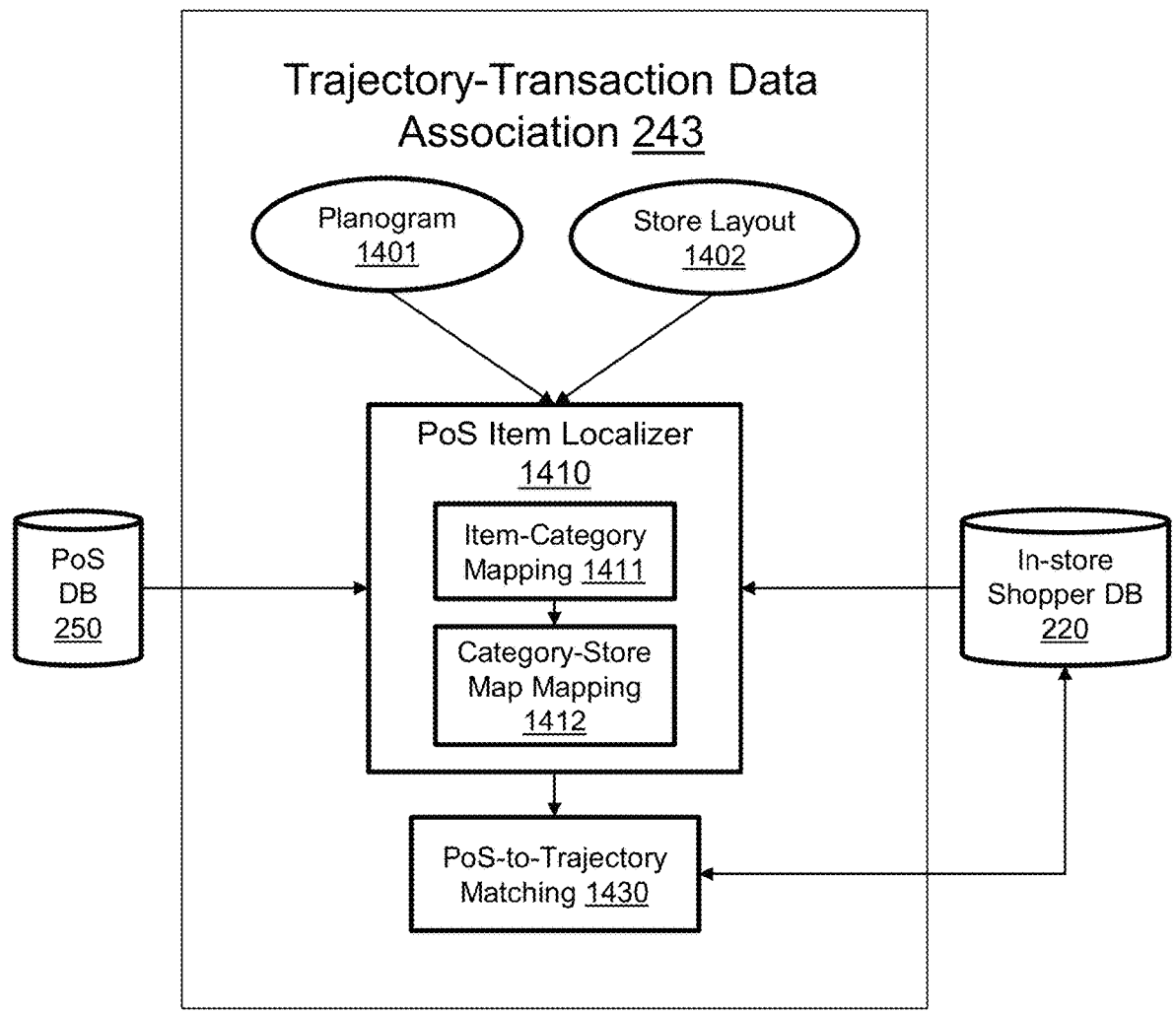
FIG. 14 shows an example block flow diagram of the Trajectory-Transaction Data Association module.

Given a complete trajectory of a shopper in a retail store that can be obtained by the Shopper Data Association 242 (which will be referred to as SDA, stored as SPD-5) process described in the previous section, the present invention can associate the given trajectory with a Point of Sale (PoS) data (which is also called transaction data or simply T-log data) that can contain a list of items purchased by a shopper. Such association process (which can be referred to as Trajectory-Transaction Data Association 243 or simply TT Association) can enable further analysis on the shopping pattern and buying behavior analysis. FIG. 14 shows an example block flow diagram of the Trajectory-Transaction Data Association 243 module.

While the trajectory data of a shopper can indicate how the shopper navigates through a store and what marketing elements the shopper has been exposed to during the shopping trip, the T-log data of the shopper can tell us what items the shopper actually purchased after a series of exposures to various marketing elements. The T-log data can be crucial to understand what products wins and fails among the competition in the shelf and the final decisions that the shopper made through a course of decision process.

FIG. 14 shows the PoS Item Localizer 1410, which can accept as inputs the Store Layout 1402 and Planogram 1401 data, in addition to the transaction data from the PoS DB 250. Given a shopper profile data (SPD-5), the PoS Item Localizer 1410 retrieves a set of transaction data that are generated about at the same time that a tracked shopper exited the store. The categories of the items in the retrieved transaction data can be identified using a pre-learned Item-Category Mapping 1411 table. The location of the identified categories of the items in the store can then be mapped using the store layout and planogram information (i.e., Category-Store Map Mapping 1412), revealing the location of the items that were picked by the shopper.

Despite the importance of T-log data in shopper behavior analysis as well as the trajectory data, it can be a challenging problem to correctly associate a T-log data with the trajectory of a shopper who made the transaction due to the lack of a consistent ID between T-log data and the trajectory. Given the list of items purchased and the timestamp that the transaction is made, however, it may be possible to find the best corresponding pair between a given shopper trajectory and a set of candidate T-log data. In this section, we present the PoS-to-Trajectory Matching 1430 module that describes how to find such best pair under the assumption that the entire store is covered by both vision and Wi-Fi sensors with a certain density for the system to be able to track shoppers in both modalities. In the later section, we will describe how this algorithm may be adapted to the cases where either modality's sensing coverage does not span the entire store. The output of this module can be shopper profile data (SPD-5) that has been updated with the corresponding T-log data.

Figure 15:
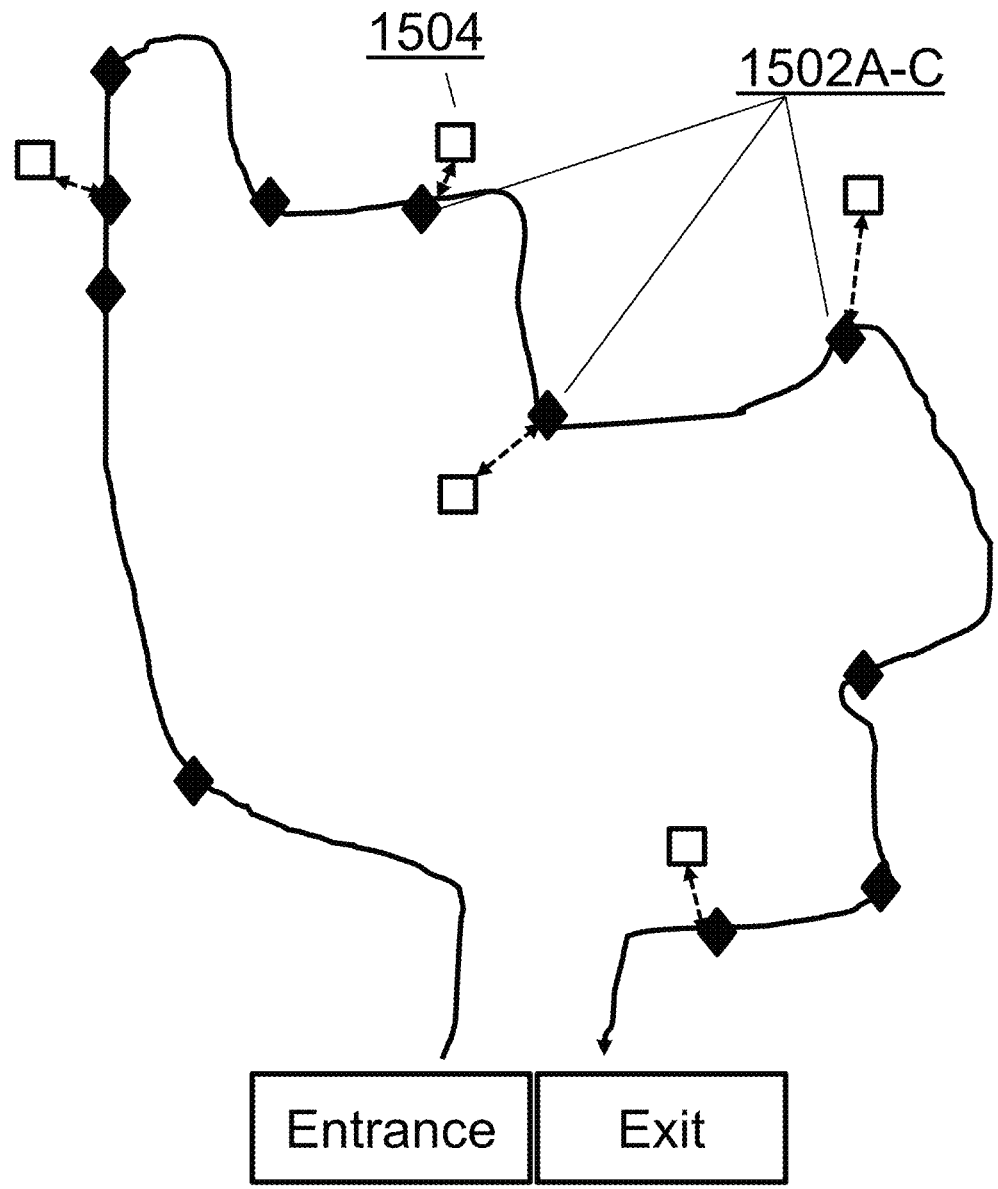
FIG. 15 shows a preferred embodiment of a method to associate transaction log data with a fused trajectory.

FIG. 15 illustrates an example of the Trajectory-Transaction Data Association (or TT Association).

General Framework

The problem of TT Association is defined as the following:

Given that a given complete trajectory and a set of T-log data in a similar time frame, to the present invention seeks find the best corresponding pairs between them if exist.

To find a T-log data that most likely matches with the trajectory, a metric that represent the matching likelihood between the given trajectory and the T-log data needs to be defined.

Therefore, given a single complete trajectory and a single T-log data $T_j$, to the present invention can compute the likelihood $P_j$ that all of the items in $T_j$ are picked up along this trajectory.

To compute the likelihood for all of the items to be picked up along the trajectory, the present invention can define a metric that measures the probability that a given item $I_i$ in a given T-log data $T_j$ is picked up along the trajectory, which is called $P(I_i|T_j)$. Then, we can find $T_j$ such that $$j = \underset{j}{\operatorname{argmax}} P_j,$$

where $$P_j = \prod_{i=1}^{N} P(I_i | T_j).$$

When computing $P(I_i|T_j)$, the present method can introduce a new term called shopping fixation. The shopping fixation can refer to an event where there is a change of shopper's behavior, and the shopper's behavior appears to be triggered by a retail element. Shopping fixation can be determined based on the motion dynamics of a shopper. If the shopper's motion gets slower and made a U-turn or stopped, then we can assume some item caught the shopper's attention, resulting in a shopping fixation 1502A-C at the point while converting a passer-by into a shopper. $P(I_i|T_j)$ can be computed only from the closest shopping fixation 1502A-C (not a just closest point) in the trajectory to the item of interest $I_i$ 1504.

In an embodiment, $P(I_i|T_j)$ may be defined as the following: if at least a shopping fixation (which will be referred to as S) exists within a visible and reachable range r from the item, then $P(I_i|T_j)$ will be equal to 1 and otherwise 0 to ensure that every item is picked up along the trajectory.

$$P(I_i \mid T_j) = \begin{cases} 1, & \exists\, S \leq r \\ 0, & \text{Otherwise} \end{cases}$$

In another embodiment, $P(I_i|T_j)$ may be defined to make $P_j$ robust to potential errors in shopping fixation detection and shopper tracking. To accommodate such errors, $P(I_i|T_j)$ may be defined as:

$$P(I_i \mid T_j) = \begin{cases} 1, & \exists\, S \leq r_1 \\ 0.5, & r_1 < \exists\, S \leq r_2 \\ \ldots \\ 0.1, & \text{Otherwise} \end{cases}$$

where $r_1 < r_2 < \ldots < r_K$.

Instead of using a probabilistic measure, we can also solve this problem using a geometric distance statistics. In this case, the probabilistic measure $P(I_i|T_j)$ can be replaced by a distance metric $d_i^j$ that represents the distance from the item $I_i$ 1504 to the closest shopping fixation 1502A in the trajectory $T_j$. We can then define the overall distance metric $D_j$ like the following:

$$D_j = \sum_{i=1}^{N} (d_i^j)^2$$

Using these metrics between a trajectory and a T-log data, the present invention can iterate this process over all trajectory candidates and find the one with minimum distance or maximum probability for the given T-log data.

Given the complete trajectory and its associated T-log data of a shopper with a unique ID assigned by solving the TT Association problem, the present invention has outlined a full understanding of (1) how the shopper navigates through the store, (2) what part of the aisle or category caught the attention of the shopper, and (3) what items the shopper actually purchased.

Practical Deployment: Adaptation to Four Different Configurations

Depending on the business requirements and applications, the sensor deployment may have restrictions and/or different assumptions, which requires an adaptation of the algorithms accordingly to the specific sensor deployment configuration. The present invention can adapt the framework to four different sensor deployment configurations that may be frequently encountered in various real situations. However, there could be more diverse configurations in different applications where similar adaptation may be applied. The four sensor deployment configurations are listed and classified as shown in the following table:

|  | Vision Coverage | |
| --- | --- | --- |
| Wi-Fi Coverage | Full/Full Partial/Full | Full/Partial Partial/Partial |

Full coverage can mean that the union of the sensing ranges of the sensors covers the entire store while partial coverage can mean that the sensor network system covers only a part of the store such as entrance, exit, and an area of interest (e.g., an aisle or a category). FIGS. 16-19 show four different types of such configuration with two different sensing modalities.

Figure 16:
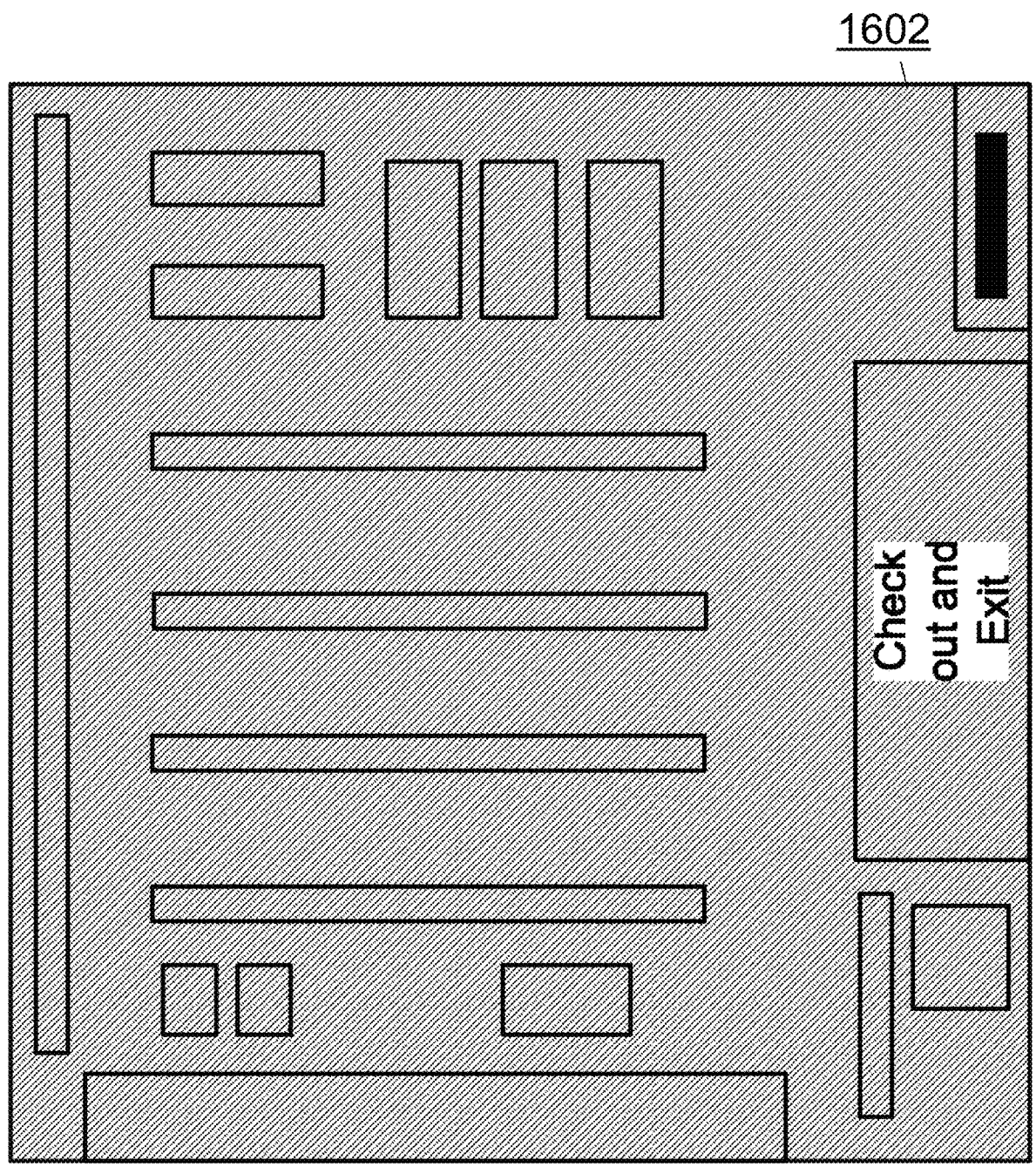
FIG. 16 shows an example of a sensor configuration where Wi-Fi and vision sensors are deployed so as to cover the entire retail space.
Figure 17:
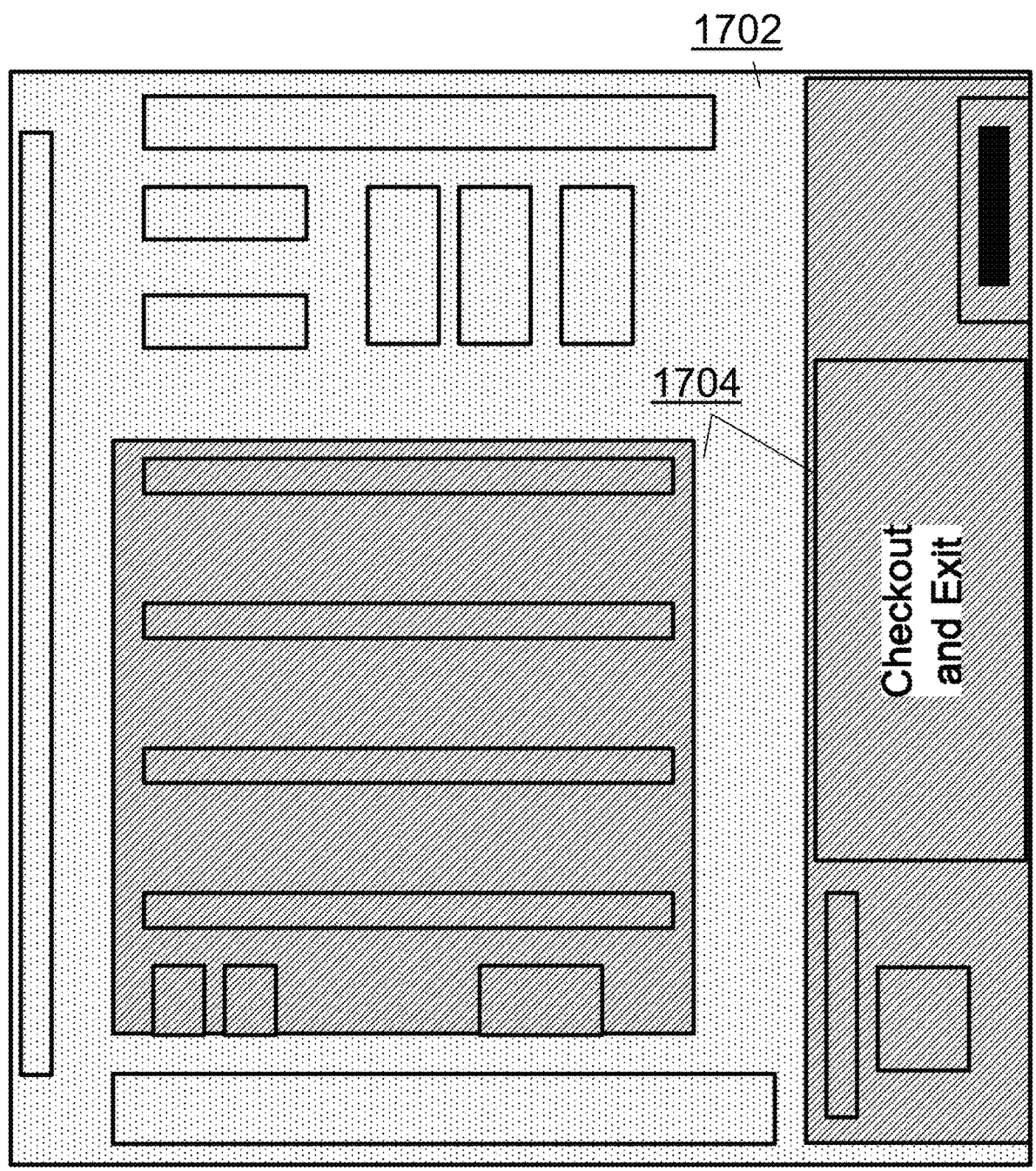
FIG. 17 shows an example of a sensor configuration where Wi-Fi sensors cover the entire retail space and vision sensors cover areas of interest.
Figure 18:
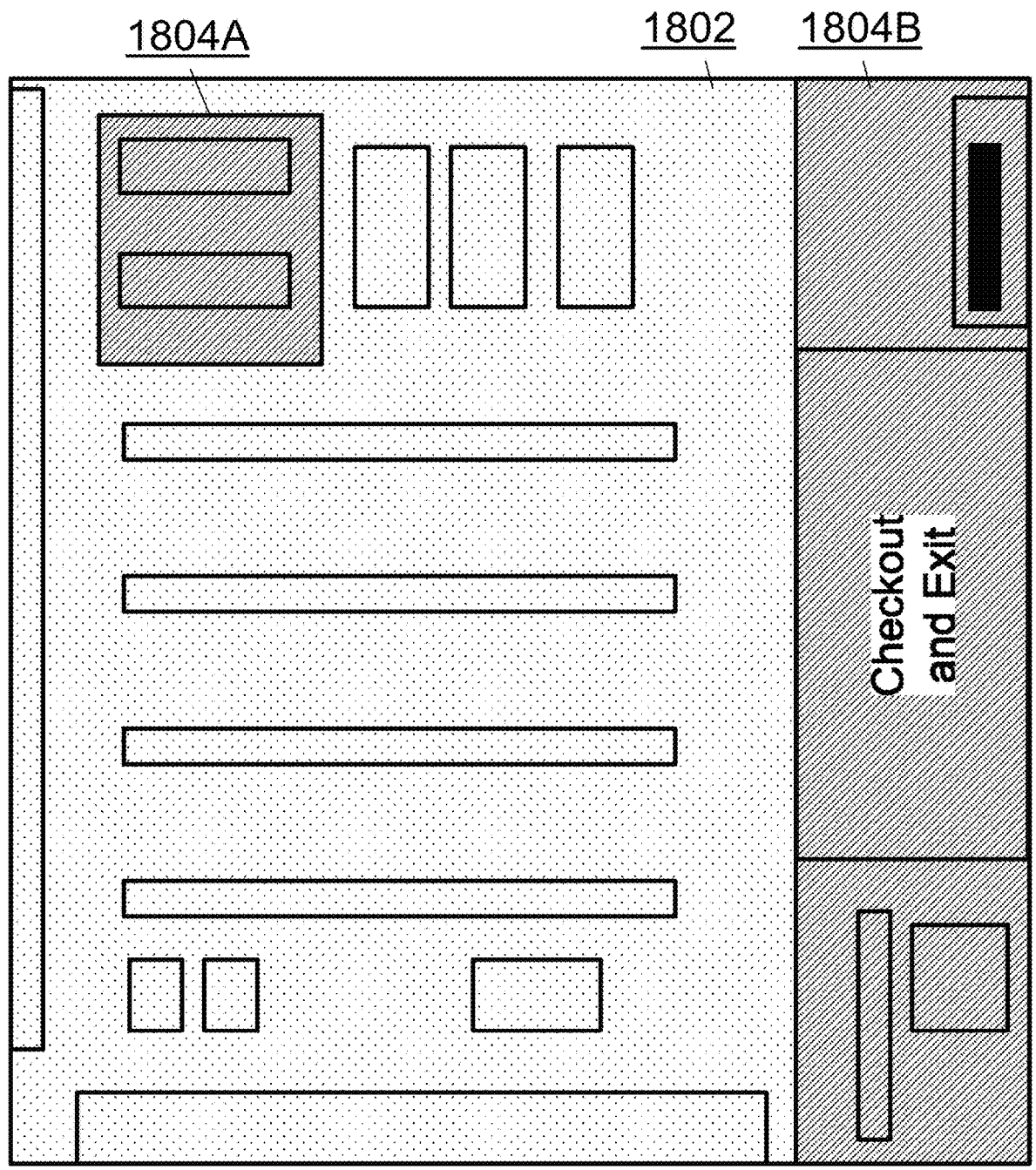
FIG. 18 shows an example of a sensor configuration where vision sensors cover the entire retail space and Wi-Fi sensors cover areas of interest.
Figure 19:
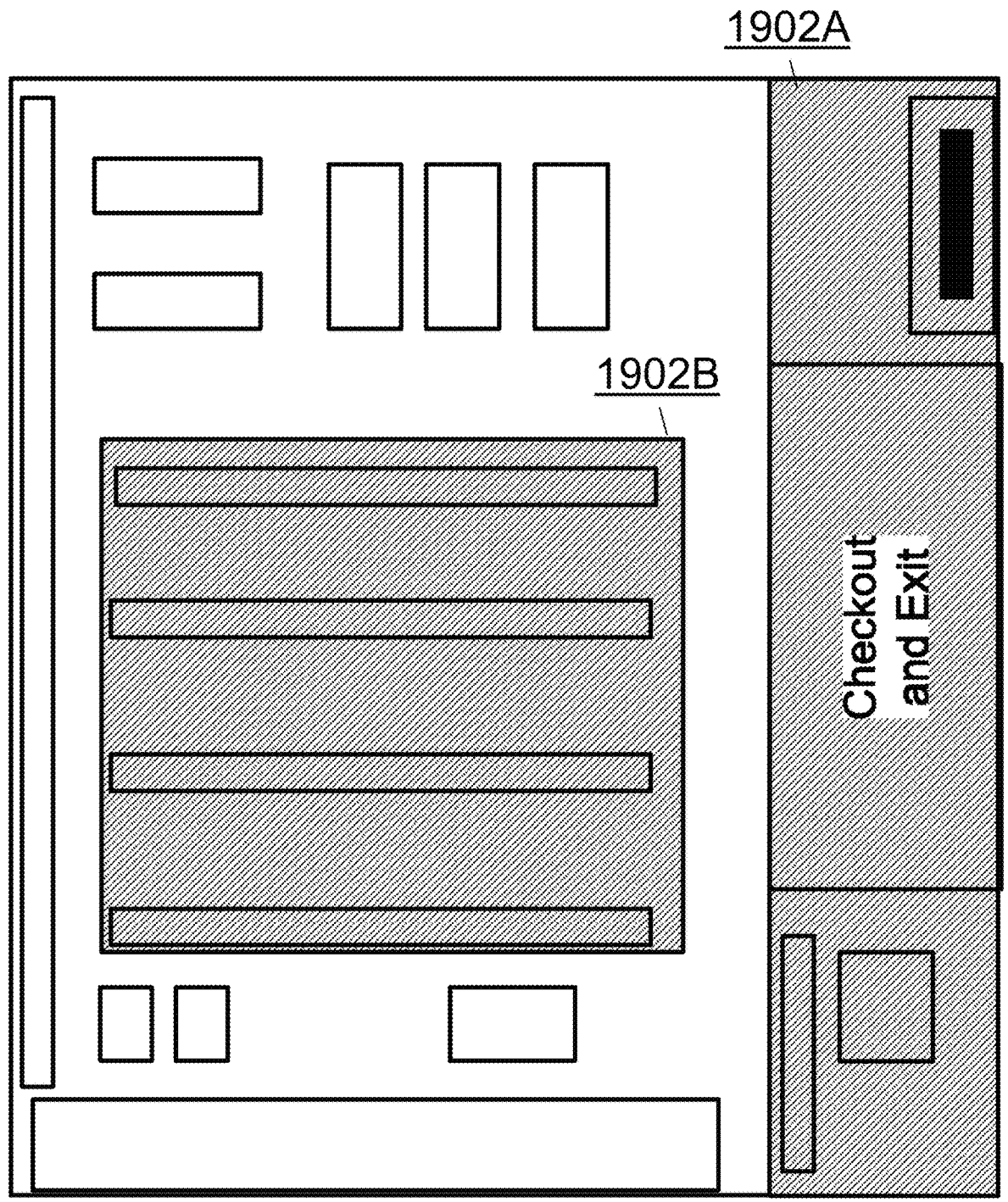
FIG. 19 shows an example of a sensor configuration where vision and Wi-Fi sensors overlap and cover areas of interest in a retail store.

FIG. 16 shows an example of a store layout covered entirely by Wi-Fi and vision sensors. The hatched lines 1602 indicates overlapping coverage by Wi-Fi and vision sensors. FIG. 17 shows an example of a partial video and full mobile coverage configuration. In this configuration, the entire store 1702 can be covered by Wi-Fi sensors and areas of interest 1704 including entrance, checkout and exit can be covered by an overlapping coverage of Wi-Fi and vision sensors. FIG. 18 shows an example of a full video and partial mobile coverage configuration. In this configuration, the entire store 1802 can be covered by vision sensors and areas of interest 1804A-B including entrance, checkout and exit can be covered by Wi-Fi sensors. FIG. 19 shows an example of partial video and partial mobile coverage configuration. In this configuration, areas of interest 1902A-B including entrance, checkout, and exit can be covered by overlapping Wi-Fi and vision sensors.

1. Full Vision Coverage/Full Wi-Fi Coverage

MT Fusion: Given full vision and full Wi-Fi coverage the Multi-modal Trajectory Fusion 241 (MT Fusion) can be carried out by the exactly same approach as described in FIG. 11.

TT Association: Given a complete trajectory by the Multi-modal Trajectory Fusion process, the Trajectory-Transaction Data Association 243 (TT Association) can also be carried out by the exact same approach descibed in FIG. 14 since the description of the TT Association 243 algorithm assumes the availability of full vision and full Wi-Fi coverages.

Once MT Fusion 241 and TT Association 243 is performed, then the data that we can collect for a shopper can include the T-log data and the complete trajectory of the shopper with its unique ID.

2. Partial Vision Coverage/Full Wi-Fi Coverage

MT Fusion: MT Fusion 241 can be inherently designed to work with partial vision coverage since it can take a set of partial trajecotry segments generated from vision tracking 231. The Trajectory Fusion 1160 and Trajectory Interpolation 1170 processes in MT Fusion 241 can address the limitations of partial vision coverage and generate a complete trajectory. The rest of the process can follow the same process described in FIG. 11 in the case of full vision and full Wi-Fi coverage.

Figure 20:
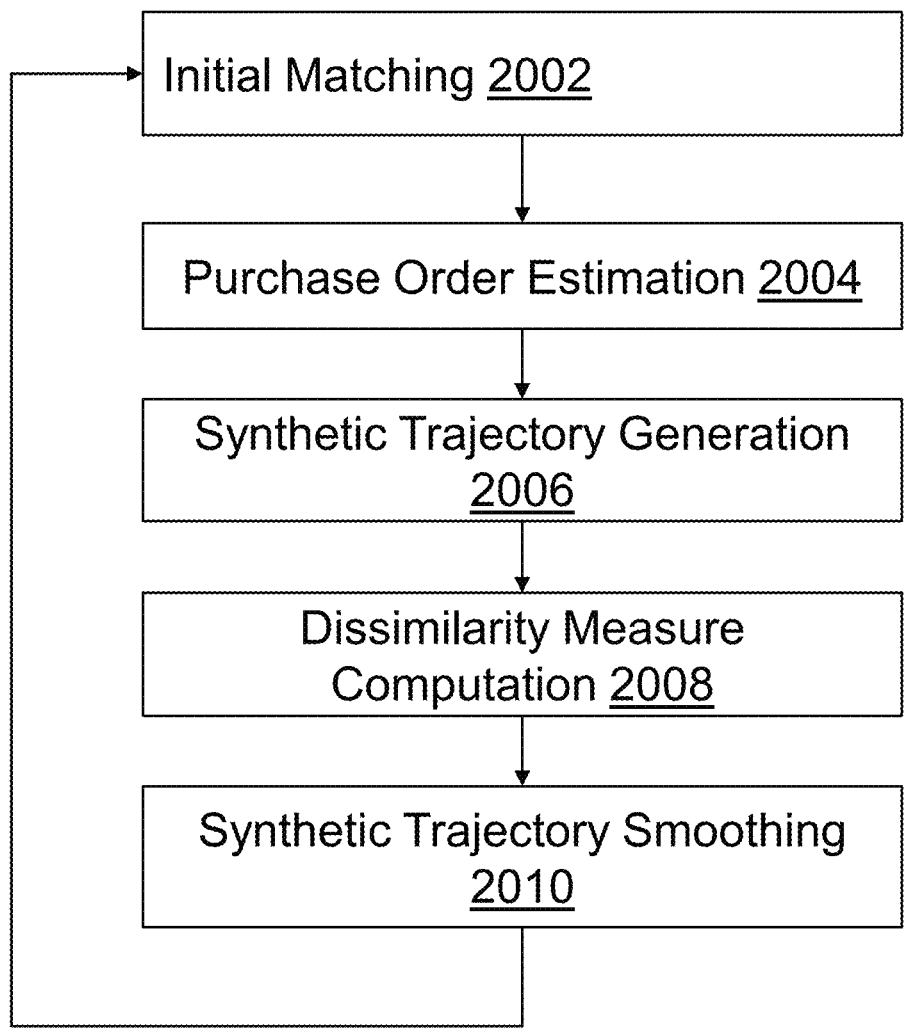
FIG. 20 shows an example block flow diagram for determining trajectory-transaction data association in a scale space.

TT Association: Once the MT Fusion 241 of trajectories from both modalities is carried out, at least some part of the trajectory can be reconstructed solely from the WT due to the partial vision coverage. The portion of the trajectory reconstucted solely from the WT can be inherently generated with low sampling fequency and low accuracy due to the nature of Wi-Fi based tracking, which can therefore be more smoothed and/or under-sampled compared to the part generated with both modalities. FIG. 20 shows a preferred embodiment for TT association 243 in this configuration.

These characteristics of the trajectory can require a more careful matching process in associating the T-log data to the trajectory. In an embodiment, The TT Association 243 can be carried out by an iterative approach that computes a distance measure between a T-log data and a trajectory in a scale space as shown in FIG. 20. The process can start from estimating the order of the items being purchased by (1) first laying down the fused trajectory (i.e., FT) on the store floor plan with the location of the purchased items marked in the Initial Matching module 2002, (2) associating each purchased item with the timestamp of the closest shopping fixation point in the FT in the Purchase Order Estimation module 2004, and (3) creating a synthetic trajectory (which we will refer to as ST) by connecting the location of the purchased items in time order in the Synthetic Trajectory Generation module 2006. Once the ST is created, then we can (4) compute a similarity measure between the FT and the ST in the scale space of the ST. The scale space of the ST can be created by applying a Gaussian with multiple kernel widths to the ST. We can then (5) find the minimum distance between the FT and the ST, whch can be the dissimilarity measure between each pair in the scale space of the ST in the Dissimilarity Measure Computation module 2008. By (6) iterating this process for all the candidate STs with different smoothing factors after performing the smoothing in the Synthetic Trajectory Smoothing module 2010, the T-log data corresponding to the ST that has the minimum dissimilarity with the FT can be found.

Figure 21:
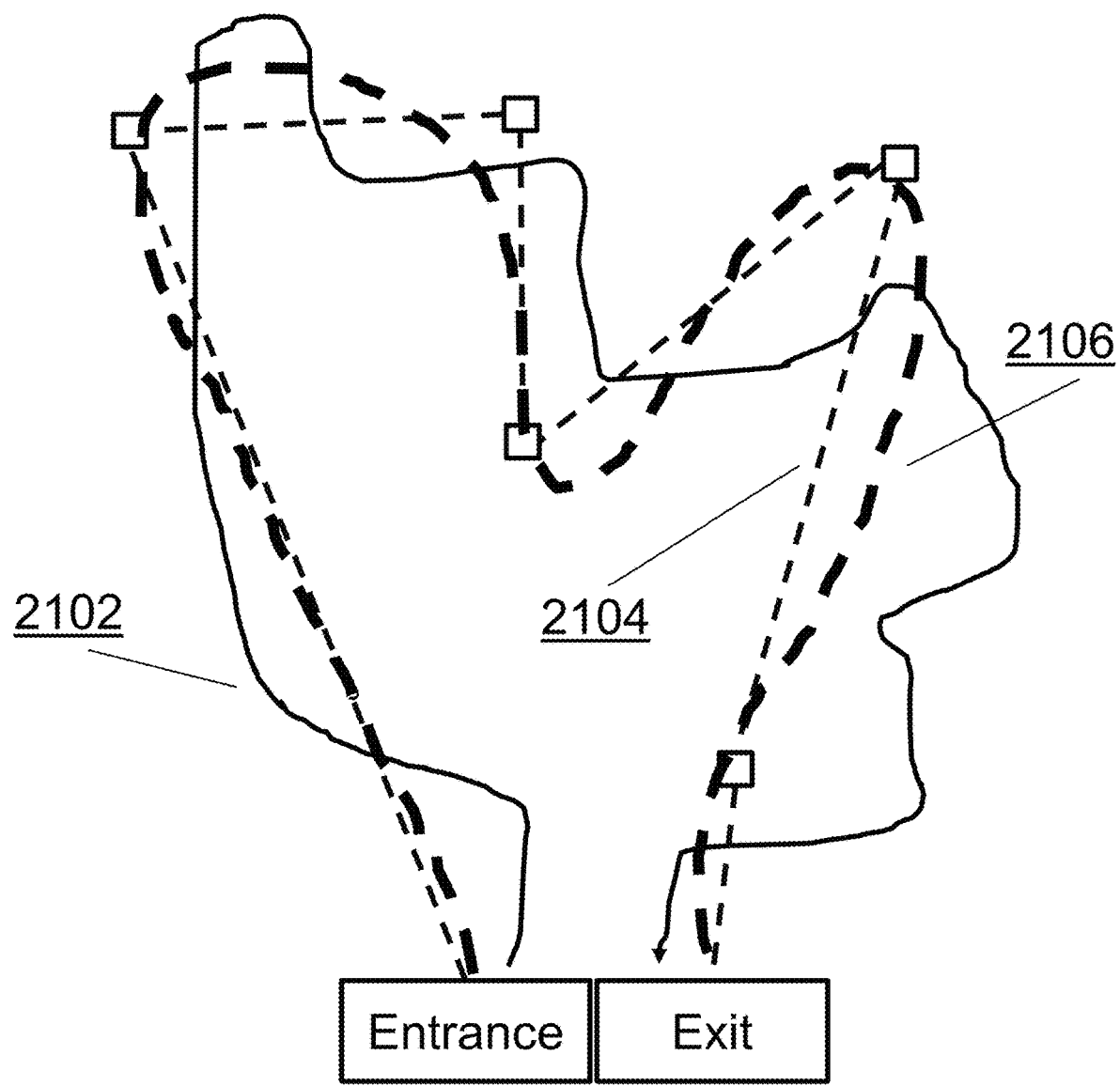
FIG. 21 shows an example and an exemplary method for determining the synthetic trajectory using transaction data.

In FIG. 21, an examplary synthetic trajectory is shown in two scale levels: the thin dotted line 2104 stands for a synthetic trajectory with no smoothing while the thick dotted line 2106 does with a smoothing. An actual trajectory 2102 can be laid down too for visualization purpose.

Once we perform MT Fusion and TT Association, then the data that we can collect for a shopper can be the same as the case of full vision and full Wi-Fi coverage case, such as the T-log data and the complete trajectory of the shopper with its unique ID.

3. Full Vision Coverage/Partial Wi-Fi Coverage

MT Fusion: Unlike the two previous cases, this configuration does not allow us to perform the store-wide MT Fusion 241 process since the present configuration cannot generate a complete trajectory that serve as an anchor to aggregate fragmented trajectories from vision-based tracking. We may still track shoppers with vision sensors to some extent although it will essentially have discontinuities due to the lack of unique and consistent IDs, which is inherent in visual features.

Figure 22:
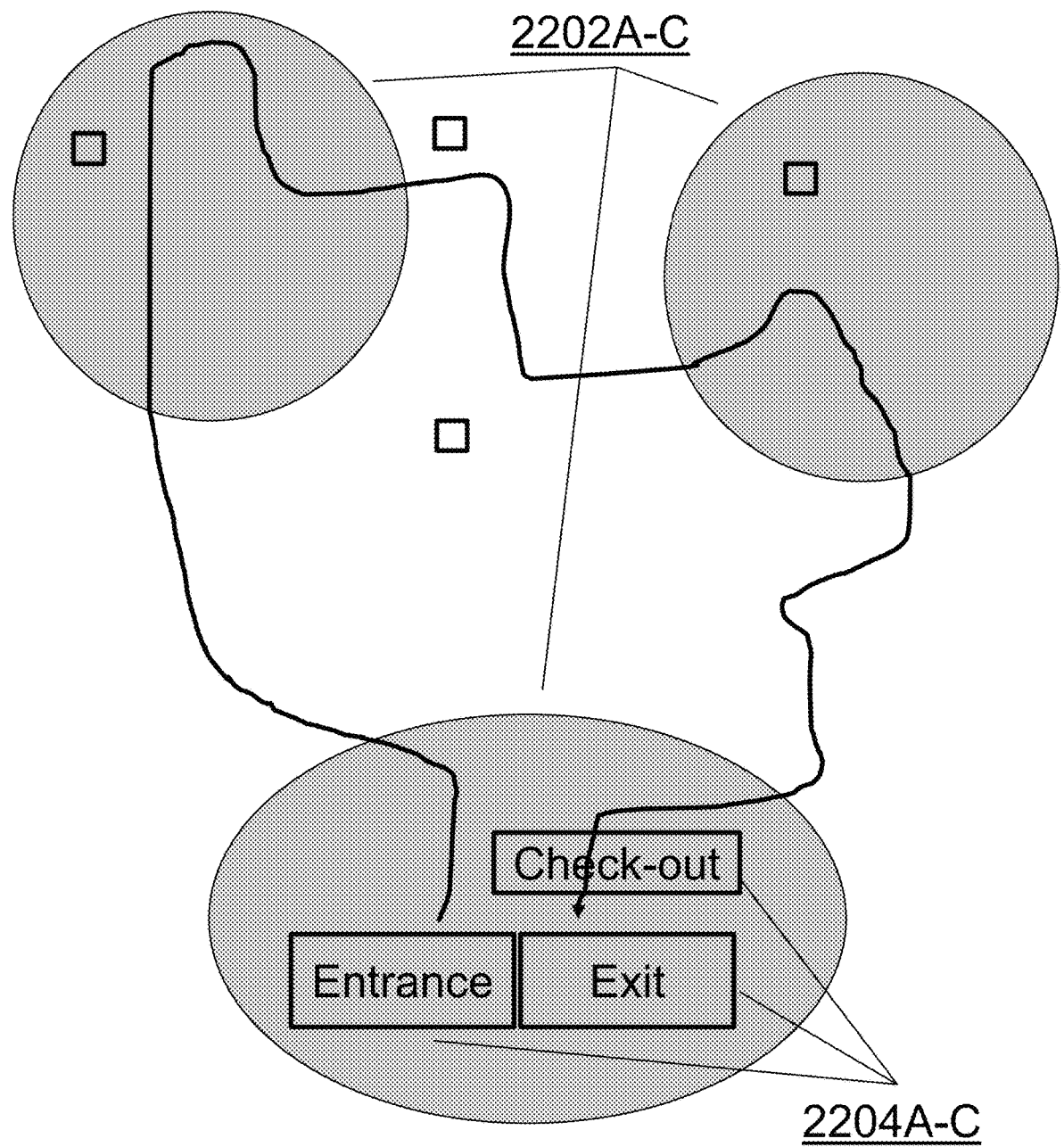
FIG. 22 shows an example of an adaptation of the trajectory-transaction data association for a configuration where tracking is not possible throughout the entire retail space.

FIG. 22 describes an example of an adapted Trajectory-Transaction Data Association. Although the invention cannot perform store-wide tracking with Wi-Fi signals in this configuration, the present invention can detect Wi-Fi signals in the areas of interest 2202A-C and identify the visitor with the unique ID. Therefore, the present method can perform a comparison of the shopper count at entrance/exit 2204A-C with the shopper count at an area of interest 2202A-C where Wi-Fi sensors are deployed. In addition, the repeated visitors over time can be determined, enabling a long-term behavior analysis. Any data that can be obtained from vision-sensing systems can also be available for further analysis.

TT Association: Due to the lack of association of the unique ID from Wi-Fi signals with vision trajectories, there may not be a complete trajectory of a shopper that we want to associate with the given T-log data. However, we can associate the T-log data with a unique ID (instead of a trajectory) of a shopper by detecting the shopper in multiple areas such as the entrance 2204A, exit 2204B, and the other areas of interest 2202. Due to the nature of Wi-Fi based localization, we are only able to have a relatively loose timestamp when the Wi-Fi signal of a shopper is detected around the entrance 2204A, exit 2204B, and the other areas of interest 2202. However, even with such loose time synchronization, we may associate a visual feature model that appeared in all of the areas of interest (i.e., entrance, checkout, and an aisle, for example) and a MAC address (i.e., a unique ID) of a mobile device that are also detected in all of such areas by estimating the correlation between them in a spatio-temporal domain.

In an embodiment, the system may (1a) construct and store the visual feature model of a shopper for each vision trajectory segment with timestamps. Whenever a Wi-Fi signal is detected in any of the areas of interest, the system may also (1b) store the MAC address of the device with the timestamp. Once a shopper makes a transaction at the checkout 2202B, (2) the visual feature model of the shopper can again be created and a list of the MAC addresses of mobile devices present around the checkout 2202B can be collected. (3) The visual feature model of the shopper can be searched through the visual feature models that are already created in all of the areas of interest 2202. Once (4) the matched visual feature models are found in both the checkout and the areas of interest 2202, then the system can (5) list out the MAC addresses of mobile devices detected in similar time frames in the same areas. (6a) If there is a single MAC address that appears in all or most of such areas, then it can indicate that a shopper with the MAC address passes through all of the areas of interest and thus it can be highly likely that this shopper is actually the shopper who just made the transaction at the checkout. In case there are multiple MAC addresses that appear all the areas of interest, if they are (6-2) stored in a database, it may be used for further analysis especially when such data is accumulated in a high volume.

After the TT Association 243 module, the data collected for a shopper can be limited compared to the two previous configurations. The present invention can only be able to store the T-log data and the unique ID of the shopper, the MAC address.

4. Partial Vision Coverage/Partial Wi-Fi Coverage

MT Fusion: In this case, the present invention can assume that the partial coverages of vision and Wi-Fi sensing overlaps each other in the areas of interest, for example, the entrance, exit/checkout, an aisle of interest, etc. If the overlapped sensing coverage is relatively small compared to the entire store, the MT Fusion 241 again cannot be carried out. Therefore, what the system can measure when it comes to Wi-Fi based detection can be same as the case of full vision and partial Wi-Fi coverage. In the partial mobile and full vision configuration, store-wide shopper detection and tracking can be done because of the full vision coverage despite the lack of consistent and unique ID from mobile signal based tracking. In this configuration, the present invention cannot measure any store-wide statistics except, for example, shopper count at entrance and exit.

TT Association: Although the store-wide statistics cannot be measured, the TT Association 243 can be carried out similarly as in the full vision and partial Wi-Fi case since the sytem can build the visual feature models of shoppers in all the areas of interest and detect the Wi-Fi signal. After we perform the TT Association 243, therefore, the data that we can collect for a shopper can include the T-log data and the unique ID of the shopper.

Revisiting Shopper Identifier

Figure 23:
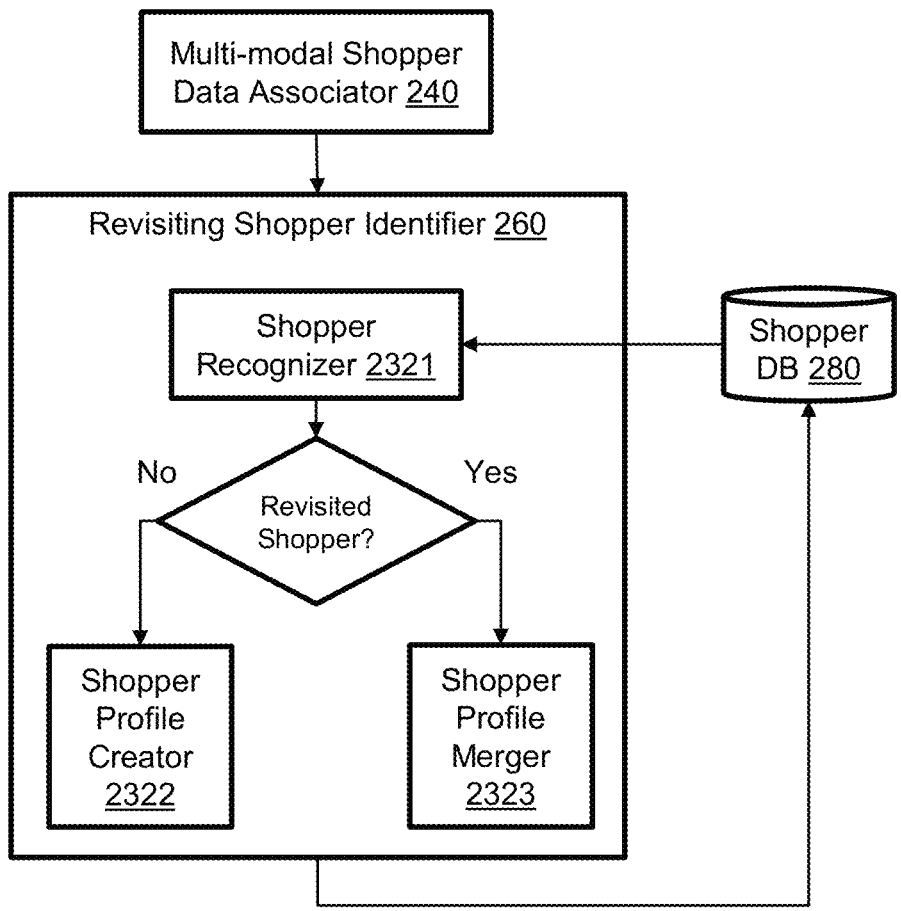
FIG. 23 shows an example block flow diagram of the Revisiting Shopper Identifier module.

FIG. 23 shows an example of the Revisiting Shopper Identifier 260 process. This process can accept as input the result of the Multi-modal Shopper Data Associator 240 (SPD-5) and can determine whether a shopper already exists in the Shopper DB 280.

The Shopper Recognizer 2321 module can use the shopper profile data (SPD-5) for the newly identified shopper to search the Shopper DB 280 looking to find whether this shopper profile data (SPD-5) matches existing shopper profile data (SPD-6) in the Shopper DB 280. The matching process in the Shopper Recognizer 2321 can be carried out based on the Shopper ID Vector (SIV) 301 of each shopper's profile data. More specifically, the Global ID Vector can be utilized since they are meant to be unique over time and space. The MAC address of radios in the mobile devices of the shoppers can clearly be the most unique identifier, so that may be used to find the match among the Shopper DB 280. In another embodiment, face features may be used as well to find the match using a face recognition algorithm in case the MAC address obtained may not be considered reliable enough due to the increasing number of applications and operating systems that use a randomized MAC address for the cases when data communication is not necessary.

If the current shopper profile data matches an existing shopper profile with similarity greater than a predetermined threshold, then the Shopper Profile Merger 2323 can retrieve the existing shopper profile data (SPD-6) and can merge it with the input shopper profile data, updating the existing shopper profile data (SPD-6) with the new measurements in SPD-5. If a match is not found exceeding a predetermined threshold, then a new instance of shopper profile data (SPD-6) can be created in the Shopper DB 280, using the Shopper Profile Creator 2322.

Shopper Behavior Profiler

Figure 24:
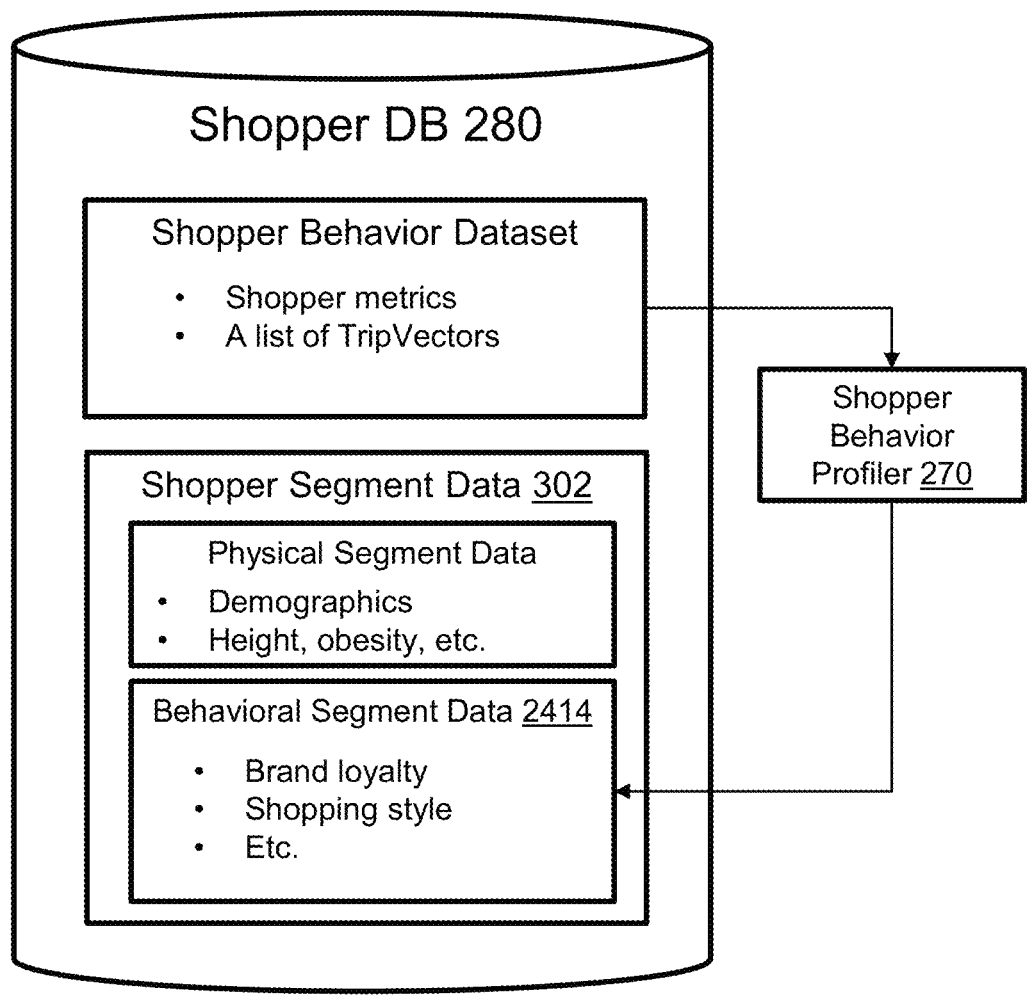
FIG. 24 shows an example block flow diagram of the Shopper Behavior Profiler module.
Figure 25:
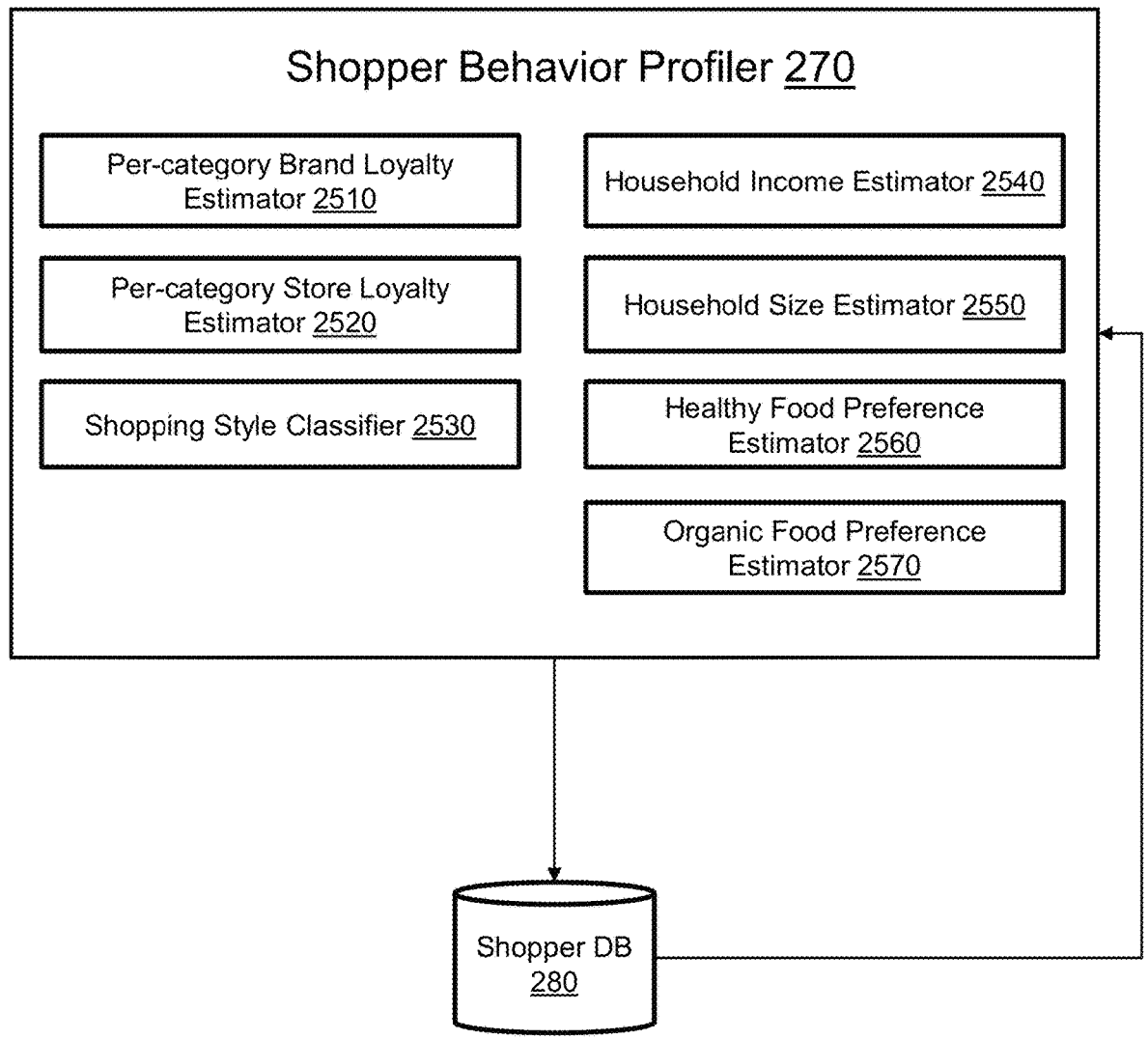
FIG. 25 shows an example of some components comprising the Shopper Behavior Profiler module.

FIGS. 24 and 25 show an example of the Shopper Behavior Profiler 270. The Shopper Behavior Profiler 270 can accept as inputs the shopper profile data (SPD-6) from the Shopper DB 280 and a list of derivable metrics. The derivable metrics can include, but are not limited to, brand loyalty 2510, shopping style 2530, store loyalty 2520, household income 2540, household size 2550, healthy food preference 2560, and organic food preference 2570. Given the shopper profile data of a shopper that has measurements about the shopper over an enough period of time, the Shopper Behavior Profiler 270 may estimate the derivable metrics using a machine learning and/or a classification algorithm. In an embodiment where the brand loyalty of a shopper is to be estimated, the purchase history of the shopper and how quickly the shopper picks the item of a particular brand may be used to determine how loyal the shopper is to the brand. If a shopper takes a long time when picking up an item or alternates frequently the brand of the similar item, it would be a good indication that this shopper may not be loyal to that brand. A regression machine may be used to estimate the brand loyalty of a shopper to a particular brand.

In another embodiment, where the shopping style of a shopper is to be estimated, the average amount of items bought in a single trip and the visit frequency of a shopper to a retail store may be used to determine if the shopper is, for example, either a type of shopper who visits the retail store once a week and purchase all the groceries for the entire week or a type of shopper who frequently visits the retail store and purchase items in immediate need. A classification machine may be used to estimate the type of a shopper.

The estimated results from each calculated derivable metric can then be saved in the Behavioral Segment Data 2414 section of the Shopper Segment Data 302 portion of the Shopper DB 280.

Anonymous Panel Creator

Figure 26:
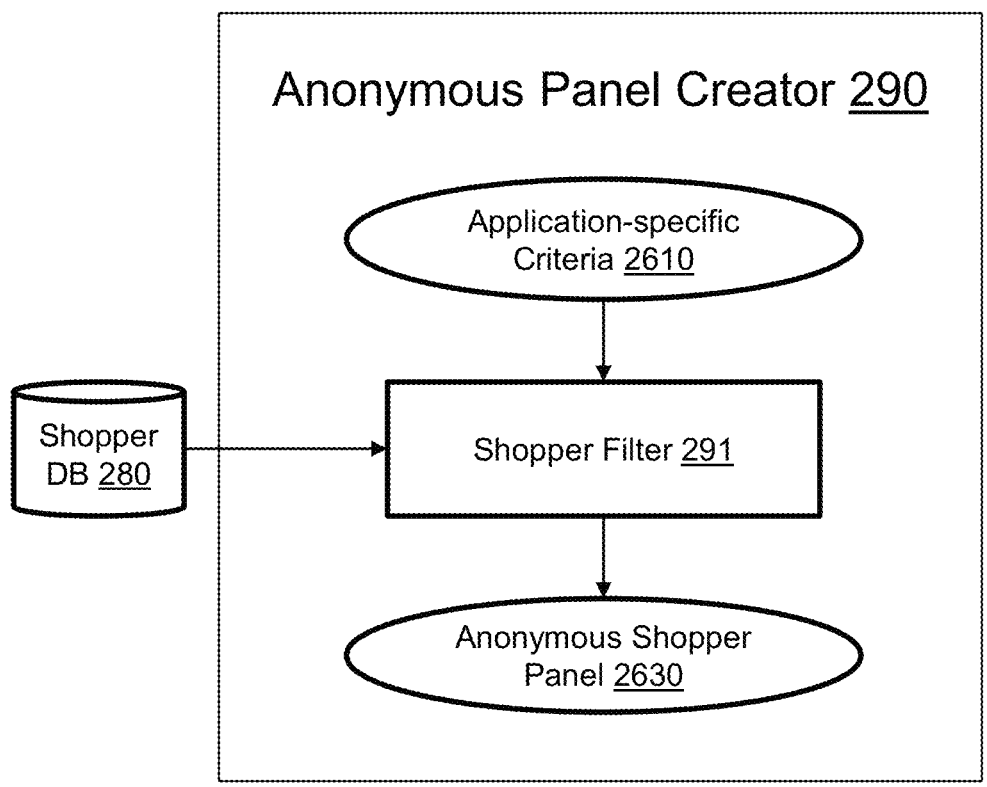
FIG. 26 shows an example block flow diagram of the Anonymous Panel Creator module.

FIG. 26 shows an example of the Anonymous Panel Creator 290 process. This process can accept Application-specific Criteria 2610 and data from the Shopper DB 280 as input. The Shopper Filter 291 can then choose the shopper profile data (SPD-6) that meets the application-specific criteria, providing only the qualified shopper profile data. The output of the Shopper Filter can become the Anonymous Shopper Panel 2630.

For example, a consumer packaged goods manufacturer may be interested in an analysis of all shoppers from a particular demographic category. An anonymous panel could then be created from all shoppers that have purchased a particular product. The panel could be further refined to include only shoppers that have visited the retail location a minimum number of times in the past several months, and who meet certain demographic requirements, such as females over age 30, belonging to a particular income category. Further yet, the panel could include shoppers who have browsed a particular product category during a recent shopping trip. Such filtering can be carried out in the Shopper Filter 291 module using the Shopper Segment Data 302 of the shopper profile data in the Shopper DB 280. All the set of criteria used can be provided as the Application-specific Criteria 2610. Each different application may provide a different set of criteria, resulting in a different set of Anonymous Shopper Panel 2630 for that application.

While one example is provided for illustrative purposes, there are many possible criteria that can be applied to an anonymous panel, and so the criteria are not limited to the exemplary configuration.

Hardware Configuration

One of ordinary skill in the art would recognize that the set of cameras utilized for the present invention, for example as illustrated in FIGS. 1 and 4, can be ordinary surveillance cameras, high-definition cameras, low-cost surveillance cameras, infrared cameras, or other image detection devices. A preferred embodiment of the present invention has the cameras configured as to be installed in the ceiling of a retail location, but one skilled in the art would understand that the cameras could be installed in other locations, such as the walls of the location, behind a mirror, on or associated with a commercial display, aisle and shelf hardware, or railing.

One of ordinary skill in the art would also recognize that the access points (APs), for example as illustrated in FIG. 1, can be located in plain view of customers in a retail location, but also out of sight in a ceiling or other fixture. The AP can be a consumer AP device, commercial AP device, beacon device, or any other device capable of operating as an access point for Wi-Fi, Bluetooth, or other wireless modality.

Both the cameras and AP hardware can be connected by a wired network, including, but not limited to, an Ethernet based network. The cameras and AP hardware can be connected by a wireless network, including, but not limited to, a Wi-Fi network, Bluetooth network, nearfield communications (NFC) network, or other type of wireless network. A wired or wireless network can be controlled by a central server or each device can operate as an independent, "Internet of things" device. The network can be connected to the Internet to transfer data, including, but not limited to, raw data and processed data and analytics, to a remote location.

The computing hardware utilized to implement the processes and modules used in the present invention can be configured and controlled via a user-input device, including, but not limited to, a keyboard, mouse, trackpad, trackball, or remote control. Additionally, the hardware can be configured and controlled via remote access through a secure Internet connection. Any data captured and created, including both raw data and processed data and analytics, by the system can be output to a user using a display, printout, or transmitted to a remote location for further analysis.

Figure 27:
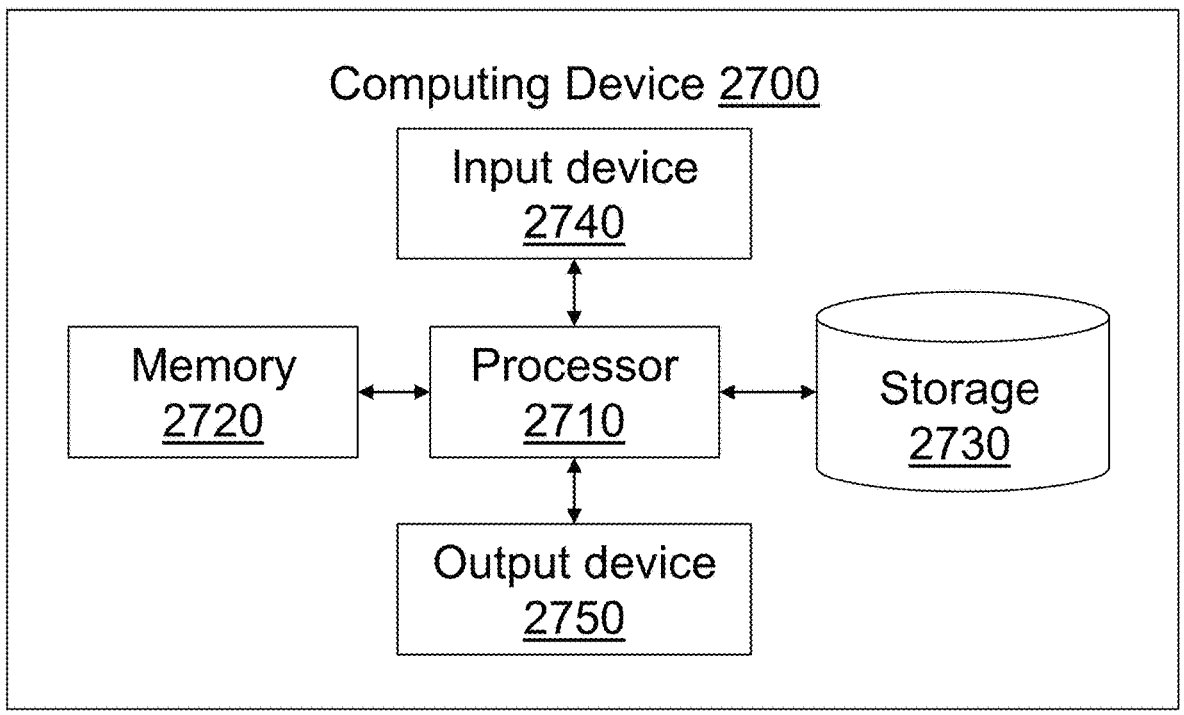
FIG. 27 shows an example computing device illustration.

FIG. 27 shows an example of a generic computer device or a generic mobile computer device, which may be used to implement the processes and modules of the present invention. The computer devices can include many forms of devices, such as desktops, workstations, servers, laptops, personal computers, personal digital assistants, single board computers such as the Raspberry Pi, and other computing devices. Mobile computing devices can include cellular telephones, smartphones, personal digital assistants, or other mobile devices. It should be understood that the computing devices and mobile computing devices listed are exemplary, and not intended to limit the implementation of the processes and modules disclosed in the present invention.

The computing device 2700 includes a processor 2710, memory 2720 (such as Random Access Memory or RAM), storage 2730 (such as a hard disk drive), input device 2740 (such as a keyboard, trackball, trackpad, or mouse), and output device 2750 (such as a CRT, LCD, or other type of display device, and an auditory device such as speakers).

Sensor Calibration

Figure 28:
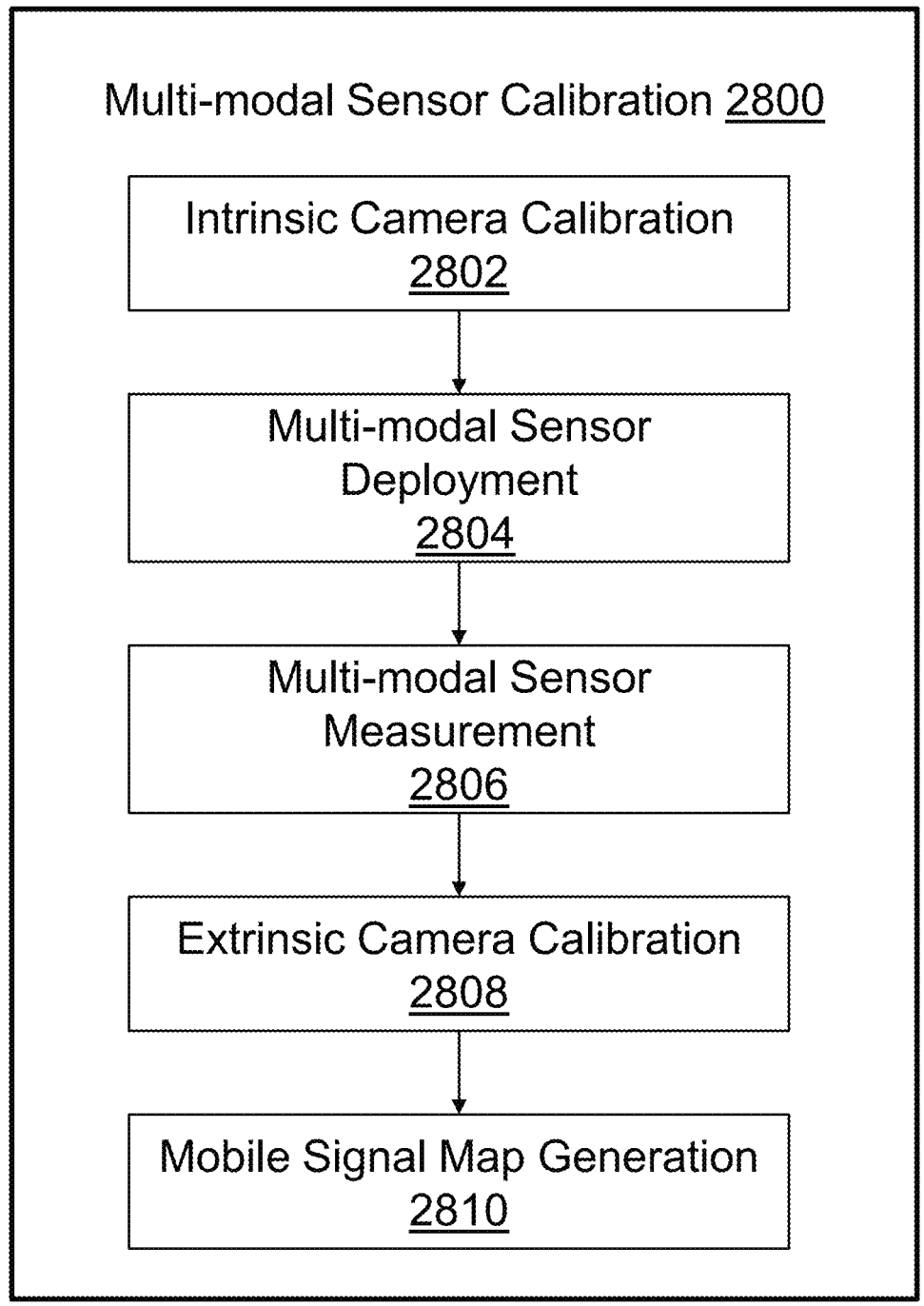
FIG. 28 shows an exemplary method to simultaneously calibrate multi-modal sensors.

FIG. 28 shows an embodiment of the procedures for the Multi-modal Sensor Calibration 2800 in which a computing machine with the assistance of one or more human operators simultaneously calibrates the cameras and the APs. In step 2802, prior to the actual deployment, the intrinsic parameters of the cameras can be calibrated with respect to focal length, lens distortion parameters, etc. In step 2804, given an area of interest, a number of cameras and APs can be deployed to cover the area with a certain sensing density that meets application-specific requirements in terms of the uncertainty bound of the measurements. The sensing density at a particular location can be defined as the number of sensors that can cover the location at the same time. For example, an application may require at least three visual measurements for the same person at a given time instance to guarantee a certain uncertainty level in vision-based location estimation of a person. The same or another application may require at least five radio measurements for the same person at a given time instance for the same purpose. Depending on such application-specific requirements, the sensor density and sensor placement is determined.

In module 2806, the deployed cameras and APs can be networked with at least one computing machine that processes measurements from the sensors. The computing machines can be time-synchronized by, for example, the network time protocol (NTP) to accurately issue a timestamp for each measurement. Once all the sensors are deployed, a set of known positions can be seen in FIG. 29 marked with an X 2910A on the floor of the area for placing a calibration pattern. The positions for the calibration pattern can be marked in such a way that each camera can clearly capture the calibration pattern when the calibration pattern is placed at the known positions. Then, a human operator (1) can carry a mobile phone with its wireless device turned on, (2) can carry a distinct visual feature (for example, wears a visually salient t-shirt), and (3) can place the calibration pattern on the known positions one after another. During the entire calibration process 2800, cameras can capture images of the human operator, and APs can detect and record the mobile signals from the human operator's mobile device.

An existing camera calibration algorithm may be employed to estimate the extrinsic calibration parameters of the cameras using the known calibration pattern at known positions. Whenever the human operator puts the calibration pattern on a known position for a period of time, s/he can also stand right beside the calibration pattern to let the cameras and APs take measurements multiple times with the timestamp for a period of time. During this period, the statistics of the mobile signal for this particular position can be obtained. After recording measurements and corresponding timestamps, the human operator can move to the next known position and can perform the same procedure for the rest of the known positions.

Since the default interval of mobile signal transmission from a mobile device may be longer than desired, a dedicated mobile device software (also called as a mobile app) may be used (1) to increase the mobile signal transmission rate and (2) to ease the process of sending commands to record the timestamp.

Given the intrinsic camera parameters and the captured images of a known calibration pattern at known positions, the extrinsic calibration can be carried out for each camera in the extrinsic camera calibration module 2808. Since the calibrated cameras can convert image coordinates into world coordinates, the human operator's location can be found in the world coordinates based on the salient visual feature of the human operator. The world coordinates of the human operator can then be associated with the mobile signal measurements captured at APs at the same time instances.

Once the relative locations of the human operator from a certain AP and its corresponding mobile signal's RSSs are known, we can now perform mobile signal RSS-to-distance map generation for each AP for trilateration-based tracking in the Mobile Signal Map Generation module 2810. In another embodiment, the same information can also be used to generate a mobile signal fingerprint for radio fingerprint-based tracking by (1) collecting the RSS measurements of the mobile signal from the human operation captured at different APs, which corresponds to particular positions and (2) generating a type of representation (e.g., vector) for each position. With a sufficiently large number of such samples, a sufficiently dense fingerprint map for an area can be generated and may be smoothed out in order to reduce noise in the fingerprint map.

Figure 29:
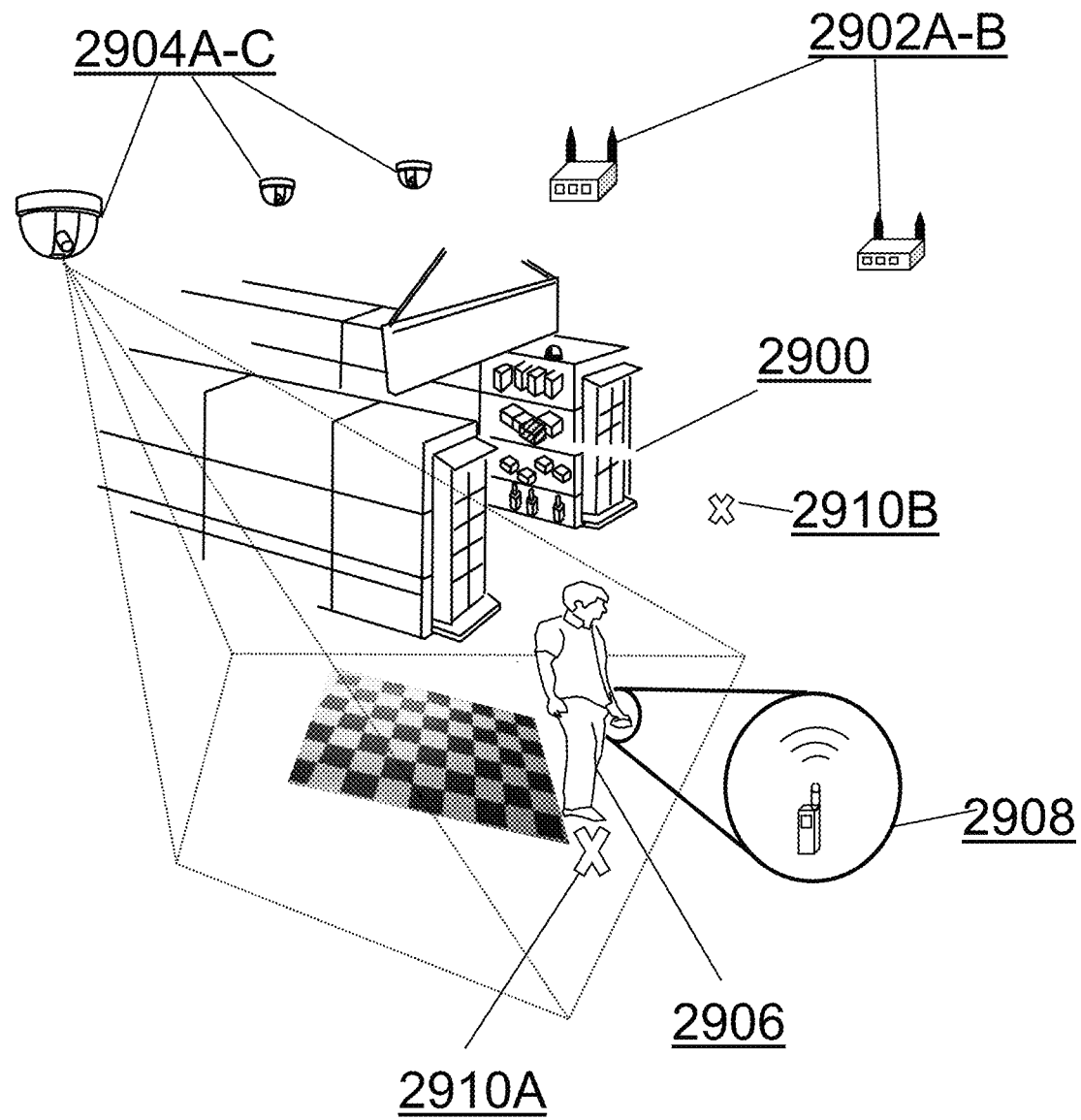
FIG. 29 shows an application of the multi-modal calibration in an exemplary embodiment.

FIG. 29 shows an illustrative example of how cameras 2902A-B and APs 2904 A-C can be calibrated and how a mobile signal RSS-to-distance map and/or of radio fingerprint can be generated in a retail store environment 2900. After a set of cameras 2902A-B and wireless sensors 2904 A-C are deployed, a human operator 2906 can carry a mobile device 2908 that is turned on and periodically transmits signals. The intervals of consecutive radio transmissions can be set to at least one or preferably several packets per second. The human operator 2906 can place a camera calibration pattern at a known position marked by X 2910A. A known position can occur where at least one camera can see the entire calibration pattern. The human operator 2906 can stand at the known position, while the cameras 2902 A-B can capture the calibration pattern and the APs 2904A-C can record all mobile signals from the human operator 2906. All vision and mobile measurements can be stored in a database with timestamps. The mobile signal measurements may be stored in a form of a statistics such as histogram or mean and standard variation. After completing these tasks at the known position, the human operator can move to the next known position 2910B and perform the same tasks until all known positions are visited.

An existing camera calibration algorithm may be employed to estimate the extrinsic calibration parameters of the cameras as explained in FIG. 28. In the meantime, a RSS-to-distance mapping function can be learned for each individual AP or for all the APs using the RSS-to-distance correspondences stored in the database. In another embodiment, a radio fingerprint for each location may also be generated using the same database. The RSS-to-distance map and radio fingerprinting methods are well-known to those with ordinary skill in the art.

We claim:

1. A method for creating an anonymous shopper panel based on an association of multi-modal shopper data, wherein the multi-modal shopper data comprises a shopper ID vector, shopper segment data, and shopper behavior data, wherein the association of multi-modal shopper data forms shopper profile data, and wherein the method is executed using a set of cameras and a set of access points connected by a wired or a wireless network, and a computing device comprising a processor, memory, an input device, and an output device to perform the steps of:
  a. detecting at least one person at the entrance of a location using an At-Door Shopper Detector module,
  b. tracking the movements of said at least one person at said location, forming at least one trajectory using a Multi-modal Shopper Tracker module, wherein the Multi-modal Shopper Tracker module further comprises the steps of:
    i. detecting an object of interest in a set of images and determining the time and location of said object,
    ii. determining whether the object of interest has been previously detected,
    iii. in the case where the object of interest has been previously detected,
      1. predicting potential locations of the object of interest,
      2. generating an expected person shape using pre-learned camera calibration parameters,
      3. placing a predicted person shape mask on the predicted location of the object of interest,
      4. extracting target features from the region within the predicted person shape mask,
      5. updating an in-store shopper database,
    iv. in the case where the object of interest has not been previously detected,
      1. generating an expected person shape using pre-learned camera calibration parameters,
      2. placing a predicted person shape mask on the predicted location of the object of interest,
      3. extracting body features from the region within the predicted person shape mask,
      4. classifying the object of interest based on the extracted body features to determine if the detected object is a person,
      5. updating the in-store shopper database with shopper profile data, wherein the shopper profile data comprises time, person location, and body features,
      6. creating a new target tracking instance for the detected person using the shopper profile data,
  c. associating at least one trajectory with shopper segment data and at least one trajectory with Point-of-Sale (PoS) data to generate shopper profile data using a Multi-modal Shopper Data Associator module and a Trajectory-Transaction Data Association module, wherein the Trajectory-Transaction Data Association module identifies a transaction-log data that matches a trajectory using spatio-temporal parameters, and wherein the Multi-modal Shopper Data Associator further comprises the steps of:
    i. detecting the completion of at least one mobile trajectory,
    ii. retrieving a set of shopper profile data from the in-store shopper database, wherein the shopper profile data contains vision trajectories,
    iii. performing matching between the vision trajectories and the mobile trajectory,
    iv. identifying a subset of vision trajectories that correspond to the mobile trajectory,
    v. associating the identified vision trajectories with the detected mobile trajectory and store in the in-store shopper database as new shopper profile data,
    vi. fusing vision trajectories that are associated with the same target at a given time frame using measurement fusion into a single fused vision trajectory representing the target,
    vii. combining the fused vision trajectory with the mobile trajectory to complete missing segments in the fused vision trajectory, wherein the combining comprises:
      1. identifying missing segments within the fused vision trajectory,
      2. identifying missing holes in the mobile trajectory and estimating the missing holes by inferring the most probable path taken by the target based on the store layout and other shoppers' trajectories measured before and after the missing holes in the mobile trajectory;
      3. identifying exact segments in the mobile trajectory that correspond to the missing segments, and
      4. interpolating the missing segments by excerpting the identified exact segments from the mobile trajectory to create a single combined trajectory;
    viii. refining the combined trajectory to accommodate physical constraints, wherein the physical constraints comprise fixtures and equipment in the store layout, and
    ix. updating the in-store shopper database by merging the refined combined trajectory with the shopper profile data,
  d. identifying a revisiting shopper using shopper profile data from the Multi-modal Shopper Data Associator module and populating a shopper database with the result, using a Revisiting Shopper Identifier module,
  e. using the shopper database, a Shopper Behavior Profiler module, and an Anonymous Panel Creator module, creating an anonymous shopper panel for at least one application using a set of application-specific criteria, wherein the anonymous shopper panel is created by filtering the shopper profile data to determine the data that meets application-specific criteria, creating the anonymous panel using the filtered shopper profile data.

2. The method of claim 1, wherein the At-Door Shopper Detector module further comprises:

a. capturing a set of images using at least one camera of the set of cameras, wherein the camera is directed toward an area where at least one person is likely to be present,
b. tracking the at least one person in each image frame when visible to the camera,
c. searching for a face for each person tracked,
d. creating shopper profile data for each face detected for each new person being tracked,
e. extracting a set of features for each person tracked, wherein the set of features comprise body features and a shopper shape prediction,
f. estimating demographics information for each detected person, wherein the demographics information comprises gender, age, and ethnicity, and
g. updating the in-store shopper database with the set of features and the demographics information.

3. The method of claim 2, wherein the estimating demographics information further comprises:
a. normalizing each face with respect to scale and rotation,
b. using a pre-trained gender model to estimate gender,
c. using a pre-trained age group model to estimate an age group,
d. using a pre-trained ethnicity model to estimate ethnicity, and
e. updating the in-store shopper database with the gender estimate data, the age group estimate data, and the ethnicity estimate data.

4. The method of claim 1, wherein the Multi-modal Shopper Tracker module further comprises:
a. determining whether a new instance of shopper profile data already exists in the in-store shopper database,
b. searching the in-store shopper database to find a shopper profile data that has the best match with the new instance of shopper profile data,
c. merging the new instance of shopper profile data with the best matched shopper profile and updating the in-store shopper database, if a match is found, and
d. updating the in-store shopper database with the new instance of shopper profile data if a match is not found.

5. The method of claim 1, further comprising the steps of:
a. receiving a data stream from a plurality of mobile signal sensors, wherein the data stream comprises packets containing time, the ID of a mobile signal sensor, the MAC address of a source device, and the received signal strength (RSS), and wherein the data stream is stored in a temporary buffer,
b. sorting received data from mobile signal sensors from the same source device to bundle them into a single set,
c. converting RSS from each mobile signal sensor into a distance using a pre-learned RSS-to-distance mapping function, for the bundled set for each device,
d. calculating a location of the source device using a trilateration method,
e. tracking the source device using shopper profile data, and
f. updating the in-store shopper database.

6. The method of claim 5, wherein the source device is a mobile device carried by a person at the said location.

7. The method of claim 1, wherein the Multi-modal Shopper Data Associator module further comprises:
a. retrieving a set of shopper profile data from the in-store shopper database, wherein the shopper profile data was created at a time matching a time when the tracked shopper entered or exited the store,
b. computing a similarity of visual features and shopper data, wherein the visual features comprise face and body features, and the shopper data comprise estimated demographics data,
c. determining the best match between the shopper profile data with the estimated demographics data,
d. combining the best-matched data to create a new shopper profile data,
e. updating the in-store shopper database.

8. The method of claim 7, wherein the Multi-modal Shopper Data Associator module further comprises:
a. retrieving a set of shopper profile data from the in-store shopper database,
b. retrieving a set of PoS data from a PoS database, wherein the PoS data is created at a time matching a time when the tracked shopper exited the store,
c. identifying categories of items in the retrieved PoS data using a pre-learned item-category mapping table,
d. mapping the location of the categories of items in the store using store layout and planogram information,
e. computing a probabilistic or deterministic measure between the shopper profile data and the PoS data based on the likelihood that the PoS data corresponds to the shopper profile data,
f. determining the best match between the shopper profile data and the PoS data, and
g. associating the instances of the best matching shopper profile data with the PoS data.

9. The method of claim 1, wherein the Revisiting Shopper Identifier module further comprises:
a. determining whether a first set of shopper profile data already exists in the shopper database,
b. if a match is found,
 i. retrieving the existing shopper profile data from the shopper database, and
 ii. merging the first set of shopper profile data with the existing shopper profile data,
c. if a match is not found,
 i. creating a new shopper profile data, and
d. updating the shopper database.

10. The method of claim 1, wherein the Shopper Behaviors Profiler further comprises:
a. deriving metrics for each shopper profile in the shopper database, wherein the derivable metrics comprise brand loyalty, shopping style, store loyalty, healthy food preference, and organic food preference, and
b. updating a behavioral segment data section of the shopper database.

11. A system for creating an anonymous shopper panel based on an association of multi-modal shopper data, wherein the multi-modal shopper data comprises a shopper ID vector, shopper segment data, and shopper behavior data, wherein the association of multi-modal shopper data forms shopper profile data, and wherein the method is executed using a set of cameras and a set of access points connected by a wired or a wireless network, and a computing device comprising a processor, memory, an input device, and an output device to perform the steps of:
a. detecting at least one person at the entrance of a location using an At-Door Shopper Detector module,
b. tracking the movements of said at least one person at said location, forming at least one trajectory using a Multi-modal Shopper Tracker module, wherein the Multi-modal Shopper Tracker module further comprises the steps of:
 i. detecting an object of interest in a set of images and determining the time and location of said object, ii. determining whether the object of interest has been previously detected,
iii. in the case where the object of interest has been previously detected,
   1. predicting potential locations of the object of interest,
   2. generating an expected person shape using pre-learned camera calibration parameters,
   3. placing a predicted person shape mask on the predicted location of the object of interest,
   4. extracting target features from the region within the predicted person shape mask,
   5. updating an in-store shopper database,
iv. in the case where the object of interest has not been previously detected,
   4. generating an expected person shape using pre-learned camera calibration parameters,
   5. placing a predicted person shape mask on the predicted location of the object of interest,
   6. extracting body features from the region within the predicted person shape mask,
   7. classifying the object of interest based on the extracted body features to determine if the detected object is a person,
   8. updating the in-store shopper database with shopper profile data, wherein the shopper profile data comprises time, person location, and body features,
   9. creating a new target tracking instance for the detected person using the shopper profile data,
c. associating at least one trajectory with shopper segment data and at least one trajectory with Point-of-Sale (PoS) data to generate shopper profile data using a Multi-modal Shopper Data Associator module and a Trajectory-Transaction Data Association module, wherein the Trajectory-Transaction Data Association module identifies a transaction-log data that matches a trajectory using spatio-temporal parameters, and wherein the Multi-modal Shopper Data Associator further comprises the steps of:
   i. detecting the completion of at least one mobile trajectory,
   ii. retrieving a set of shopper profile data from the in-store shopper database, wherein the shopper profile data contains vision trajectories,
   iii. performing matching between the vision trajectories and the mobile trajectory,
   iv. identifying a subset of vision trajectories that correspond to the mobile trajectory,
   v. associating the identified vision trajectories with the detected mobile trajectory and store in the in-store shopper database as new shopper profile data,
   vi. fusing vision trajectories that are associated with the same target at a given time frame using measurement fusion into a single fused vision trajectory representing the target,
   vii. combining the fused vision trajectory with the mobile trajectory to complete missing segments in the fused vision trajectory, wherein the combining comprises:
      1. identifying missing segments within the fused vision trajectory,
      2. identifying missing holes in the mobile trajectory and estimating the missing holes by inferring the most probable path taken by the target based on the store layout and other shoppers' trajectories measured before and after the missing holes in the mobile trajectory;
      3. identifying exact segments in the mobile trajectory that correspond to the missing segments, and
      4. interpolating the missing segments by excerpting the identified exact segments from the mobile trajectory to create a single combined trajectory;
   viii. refining the combined trajectory to accommodate physical constraints, wherein the physical constraints comprise fixtures and equipment in the store layout, and
   ix. updating the in-store shopper database by merging the refined combined trajectory with the shopper profile data,
d. identifying a revisiting shopper using shopper profile data from the Multi-modal Shopper Data Associator module and populating a shopper database with the result, using a Revisiting Shopper Identifier module,
e. using the shopper database, a Shopper Behavior Profiler module, and an Anonymous Panel Creator module, creating an anonymous shopper panel for at least one application using a set of application-specific criteria, wherein the anonymous shopper panel is created by filtering the shopper profile data to determine the data that meets application-specific criteria, creating the anonymous panel using the filtered shopper profile data.

12. The system of claim 11, wherein the At-Door Shopper Detector module further comprises:
a. capturing a set of images using at least one camera of the set of cameras, wherein the camera is directed toward an area where at least one person is likely to be present,
b. tracking the at least one person in each image frame when visible to the camera,
c. searching for a face for each person tracked,
d. creating shopper profile data for each face detected for each new person being tracked,
e. extracting a set of features for each person tracked, wherein the set of features comprise body features and a shopper shape prediction,
f. estimating demographics information for each detected person, wherein the demographics information comprises gender, age, and ethnicity, and
g. updating the in-store shopper database with the set of features and the demographics information.

13. The system of claim 12, wherein the estimating demographics information further comprises:
a. normalizing each face with respect to scale and rotation,
b. using a pre-trained gender model to estimate gender,
c. using a pre-trained age group model to estimate an age group,
d. using a pre-trained ethnicity model to estimate ethnicity, and
e. updating the in-store shopper database with the gender estimate data, the age group estimate data, and the ethnicity estimate data.

14. The system of claim 11, wherein the Multi-modal Shopper Tracker module further comprises:
a. determining whether a new instance of shopper profile data already exists in the in-store shopper database,
b. searching the in-store shopper database to find a shopper profile data that has the best match with the new instance of shopper profile data, c. merging the new instance of shopper profile data with the best matched shopper profile and updating the in-store shopper database, if a match is found, and d. updating the in-store shopper database with the new instance of shopper profile data if a match is not found.

15. The system of claim 11, further comprising the steps of:

a. receiving a data stream from a plurality of mobile signal sensors, wherein the data stream comprises packets containing time, the ID of a mobile signal sensor, the MAC address of a source device, and the received signal strength (RSS), and wherein the data stream is stored in a temporary buffer, b. sorting received data from mobile signal sensors from the same source device to bundle them into a single set, c. converting RSS from each mobile signal sensor into a distance using a pre-learned RSS-to-distance mapping function, for the bundled set for each device, d. calculating a location of the source device using a trilateration method, e. tracking the source device using shopper profile data, and f. updating the in-store shopper database.

16. The system of claim 15, wherein the source device is a mobile device carried by a person at the said location.

17. The system of claim 11 wherein the Multi-modal Shopper Data Associator module further comprises:

a. retrieving a set of shopper profile data from the in-store shopper database, wherein the shopper profile data was created at a time matching a time when the tracked shopper entered or exited the store, b. computing a similarity of visual features and shopper data, wherein the visual features comprise face and body features, and the shopper data comprise estimated demographics data, c. determining the best match between the shopper profile data with the estimated demographics data, d. combining the best-matched data to create a new shopper profile data, e. updating the in-store shopper database.

18. The system of claim 17, wherein the Multi-modal Shopper Data Associator module further comprises:

a. retrieving a set of shopper profile data from the in-store shopper database, b. retrieving a set of PoS data from a PoS database, wherein the PoS data is created at a time matching a time when the tracked shopper exited the store, c. identifying categories of items in the retrieved PoS data using a pre-learned item-category mapping table, d. mapping the location of the categories of items in the store using store layout and planogram information, e. computing a probabilistic or deterministic measure between the shopper profile data and the PoS data based on the likelihood that the PoS data corresponds to the shopper profile data, f. determining the best match between the shopper profile data and the PoS data, and g. associating the instances of the best matching shopper profile data with the PoS data.

19. The system of claim 11, wherein the Revisiting Shopper Identifier module further comprises:

a. determining whether a first set of shopper profile data already exists in the shopper database, b. if a match is found,
  i. retrieving the existing shopper profile data from the shopper database, and
  ii. merging the first set of shopper profile data with the existing shopper profile data, c. if a match is not found,
  i. creating a new shopper profile data, and d. updating the shopper database.

20. The system of claim 11, wherein the Shopper Behaviors Profiler further comprises:

a. deriving metrics for each shopper profile in the shopper database, wherein the derivable metrics comprise brand loyalty, shopping style, store loyalty, healthy food preference, and organic food preference, and b. updating a behavioral segment data section of the shopper database.

* * * * *